United States Patent
Kezobo et al.

(10) Patent No.: US 11,364,948 B2
(45) Date of Patent: Jun. 21, 2022

(54) ELECTRIC POWER STEERING DEVICE

(71) Applicant: Mitsubishi Electric Corporation, Tokyo (JP)

(72) Inventors: Isao Kezobo, Tokyo (JP); Kenta Tanaka, Tokyo (JP); Akira Furukawa, Tokyo (JP); Masaharu Tanaka, Tokyo (JP); Akiyoshi Takashima, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 151 days.

(21) Appl. No.: 16/484,226

(22) PCT Filed: Mar. 27, 2017

(86) PCT No.: PCT/JP2017/012337
§ 371 (c)(1),
(2) Date: Aug. 7, 2019

(87) PCT Pub. No.: WO2018/179043
PCT Pub. Date: Oct. 4, 2018

(65) Prior Publication Data
US 2020/0031385 A1  Jan. 30, 2020

(51) Int. Cl.
*B62D 6/00* (2006.01)
*B62D 5/04* (2006.01)

(52) U.S. Cl.
CPC ......... *B62D 5/0463* (2013.01); *B62D 5/0493* (2013.01); *B62D 6/00* (2013.01)

(58) Field of Classification Search
CPC ....... B62D 5/0463; B62D 6/00; B62D 5/0493
See application file for complete search history.

(56) References Cited

U.S. PATENT DOCUMENTS

| 2014/0343794 | A1* | 11/2014 | Tamaizumi | B62D 5/0472 |
| | | | | 701/42 |
| 2016/0200354 | A1* | 7/2016 | Kimura | B62D 5/0472 |
| | | | | 701/42 |
| 2018/0111642 | A1* | 4/2018 | Endo | B62D 6/008 |

FOREIGN PATENT DOCUMENTS

| JP | 2004-074984 A | 3/2004 |
| JP | 2008-120265 A | 5/2008 |

(Continued)

OTHER PUBLICATIONS

International Search Report of PCT/JP2017/012337 dated May 23, 2017 [PCT/ISA/210].

*Primary Examiner* — Mathew Franklin Gordon
(74) *Attorney, Agent, or Firm* — Sughrue Mion, PLLC; Richard C. Turner

(57) ABSTRACT

There is provided an electric power steering device, including: a reverse steering detection unit configured to determine start of reverse steering when a magnitude of a rotational speed of a motor is equal to or smaller than a set speed, a rotational acceleration of the motor is in a direction of causing the rotational speed of the motor to become 0, and a magnitude of the rotational acceleration of the motor is equal to or larger than a set acceleration; and a current command control unit configured to output a current command for the motor based on the steering torque or the rotational speed of the motor, in which the current command control unit is configured to increase a transfer gain from input to output by the current command control unit when the reverse steering detection unit determines start of the reverse steering.

20 Claims, 16 Drawing Sheets

(56) References Cited

FOREIGN PATENT DOCUMENTS

JP  2011-121383 A  6/2011
WO  2012/160850 A1  11/2012

* cited by examiner

ELECTRIC POWER STEERING DEVICE

CROSS REFERENCE TO RELATED APPLICATIONS

This application is a National Stage of International Application No. PCT/JP2017/012337, filed Mar. 27, 2017.

TECHNICAL FIELD

The present invention relates to an electric power steering device configured to output an assist torque based on a steering torque.

BACKGROUND ART

An electric power steering device, which is configured to output an assist torque to be applied by a motor based on a steering torque applied by a driver of a vehicle to a steering wheel, determines the assist torque substantially proportional to the steering torque and sets a large torque proportional gain being an amplification factor of this proportional relationship to reduce the steering torque of the driver while suppressing vibration, for example, an oscillation of a control system caused by increase in torque proportional gain, to thereby improve the feeling of the driver. The torque proportional gain is also called "assist gradient".

The oscillation of the control system occurs due to decrease in stability of the control system caused by the increase in transfer gain from an output signal of a sensor to a current command of the control system, for example, the torque proportional gain. Meanwhile, it is possible to suppress the oscillation of the control system rather by increasing the transfer gain of the control system against a phenomenon in which a disturbance torque due to a steering mechanism or a road surface is transmitted to the steering wheel.

In this manner, the stability and disturbance suppression have a trade-off relationship, and thus various kinds of related arts have been proposed to suppress vibration while achieving both the stability and the disturbance suppression. In particular, at a time of reverse steering, which involves reversing a rotation direction of the steering wheel, variation in torque due to the steering mechanism is transmitted to the steering wheel, which tends to make the driver feel uncomfortable.

As such a related art, there is known an invention relating to a compensator configured to suppress a periodic disturbance synchronized with rotation of a motor (refer to Patent Literature 1, for example). In Patent Literature 1, the operation of the compensator is restricted for a predetermined period of time after it is detected that the sign of a motor rotational speed has been reversed in order to prevent the compensator configured to suppress a periodic disturbance from influencing torque variation at the time of reverse steering.

Further, as another related art, there is known an invention relating to inertia compensation for suppressing an inertial force at the time of reverse steering (refer to Patent Literature 2, for example). In Patent Literature 2, it is determined that reverse steering is being performed when the sign of a motor rotational speed and the sign of a steering torque are determined not to match each other, and inertia compensation is controlled substantially in proportion to an acceleration until predetermined rotation is achieved.

Further, as a related art for detecting reverse steering, there is known an invention configured to determine that reverse steering is being performed when a steering torque and a current are equal to or larger than predetermined values and a motor rotational speed is low (refer to Patent Literature 3, for example).

CITATION LIST

Patent Literature

[PTL 1] JP 2011-121383 A
[PTL 2] JP 2004-74984 A
[PTL 3] JP 2008-120265 A

SUMMARY OF INVENTION

Technical Problem

However, the related arts have the following problems.

That is, in Patent Literature 1, it is determined that reverse steering is detected based on reverse of the sign of the motor rotational speed, and thus there is a problem in that erroneous detection or chattering of determination tends to occur due to a noise of a rotational speed signal or vibration.

Further, in Patent Literature 2, reverse steering is detected based on the fact that the sign of the motor rotational speed and the sign of the steering torque do not match each other, and thus whether or not a determination condition is satisfied is required to be determined when the sign of the signal is reversed. As a result, similarly to the case of Patent Literature 1, there is a problem in that erroneous detection or chattering of determination tends to occur due to noises of a rotational speed signal and a steering torque signal or vibration.

Further, a situation in which the sign of the motor rotational speed and the sign of the steering torque do not match each other is originally a condition for return steering. Thus, there is a problem in that reverse steering of switching from forward steering to return steering can be detected, while reverse steering of switching from return steering to forward steering cannot be detected. For example, such reverse steering as to turn back the steering wheel a little and then immediately turn forward the steering wheel cannot be detected, for example, when corrective steering is performed during turning of a vehicle.

Further, in Patent Literature 3, reverse steering is detected when the steering torque and the current are equal to or larger than predetermined values and the motor rotational speed is low. Thus, there is a problem in that, when a steering speed is low, the motor rotational speed becomes low, which causes reverse steering to be erroneously detected although such steering is not being performed.

Further, there is a problem in that the rotation direction of the steering wheel is reversed at the time of reverse steering, and thus the direction of a friction torque is reversed after the reverse of the rotation direction such that a large disturbance torque is transmitted to the steering wheel, which makes a driver feel uncomfortable. There is a problem in that the above-mentioned related arts do not aim to suppress the disturbance torque due to the reverse of the friction and cannot suppress steering torque variation sufficiently.

Such steering torque variation at the time of reverse steering hardly occurs when the acceleration of the reverse steering is small. However, there is another problem in that reverse steering is detected even when the acceleration of the reverse steering is small in the above-mentioned related arts.

The present invention has been made to solve the above-mentioned problems, and has an object to provide an electric power steering device capable of accurately detecting reverse steering causing steering torque variation, and suppressing the steering torque variation at the time of the reverse steering to reduce discomfort felt by a driver while minimizing an influence on stability of a control system.

Means for Solving the Problems

According to one embodiment of the present invention, there is provided an electric power steering device, including: a motor configured to output a torque based on a steering torque of a driver; a motor rotational speed detection unit configured to detect a rotational speed of the motor; an acceleration calculation unit configured to calculate a rotational acceleration of the motor based on the rotational speed of the motor; a reverse steering detection unit configured to determine start of reverse steering when a magnitude of the rotational speed of the motor is equal to or smaller than a set speed, the rotational acceleration of the motor is in a direction of causing the rotational speed of the motor to become 0, and a magnitude of the rotational acceleration of the motor is equal to or larger than a set acceleration; and a current command control unit configured to output a current command for the motor based on the steering torque or the rotational speed of the motor, in which the current command control unit is configured to increase a transfer gain from input to output by the current command control unit when the reverse steering detection unit determines start of the reverse steering.

Advantageous Effects of Invention

The electric power steering device according to one embodiment of the present invention includes: a motor configured to output a torque based on a steering torque of a driver; a motor rotational speed detection unit configured to detect a rotational speed of the motor; an acceleration calculation unit configured to calculate a rotational acceleration of the motor based on the rotational speed of the motor; a reverse steering detection unit configured to determine start of reverse steering when a magnitude of the rotational speed of the motor is equal to or smaller than a set speed, the rotational acceleration of the motor is in a direction of causing the rotational speed of the motor to become 0, and a magnitude of the rotational acceleration of the motor is equal to or larger than a set acceleration; and a current command control unit configured to output a current command for the motor based on the steering torque or the rotational speed of the motor, and in the electric power steering device, the current command control unit is configured to increase a transfer gain from input to output by the current command control unit when the reverse steering detection unit determines start of the reverse steering.

Therefore, the electric power steering device can accurately detect reverse steering causing steering torque variation, and suppress the steering torque variation at the time of the reverse steering to reduce discomfort felt by a driver while minimizing an influence on stability of a control system.

DESCRIPTION OF EMBODIMENTS

A description is now given of an electric power steering device according to a preferred embodiment of the present invention with reference to the drawings, and the same or corresponding components are denoted by the same reference symbols throughout the drawings.

First Embodiment

Figure 1:
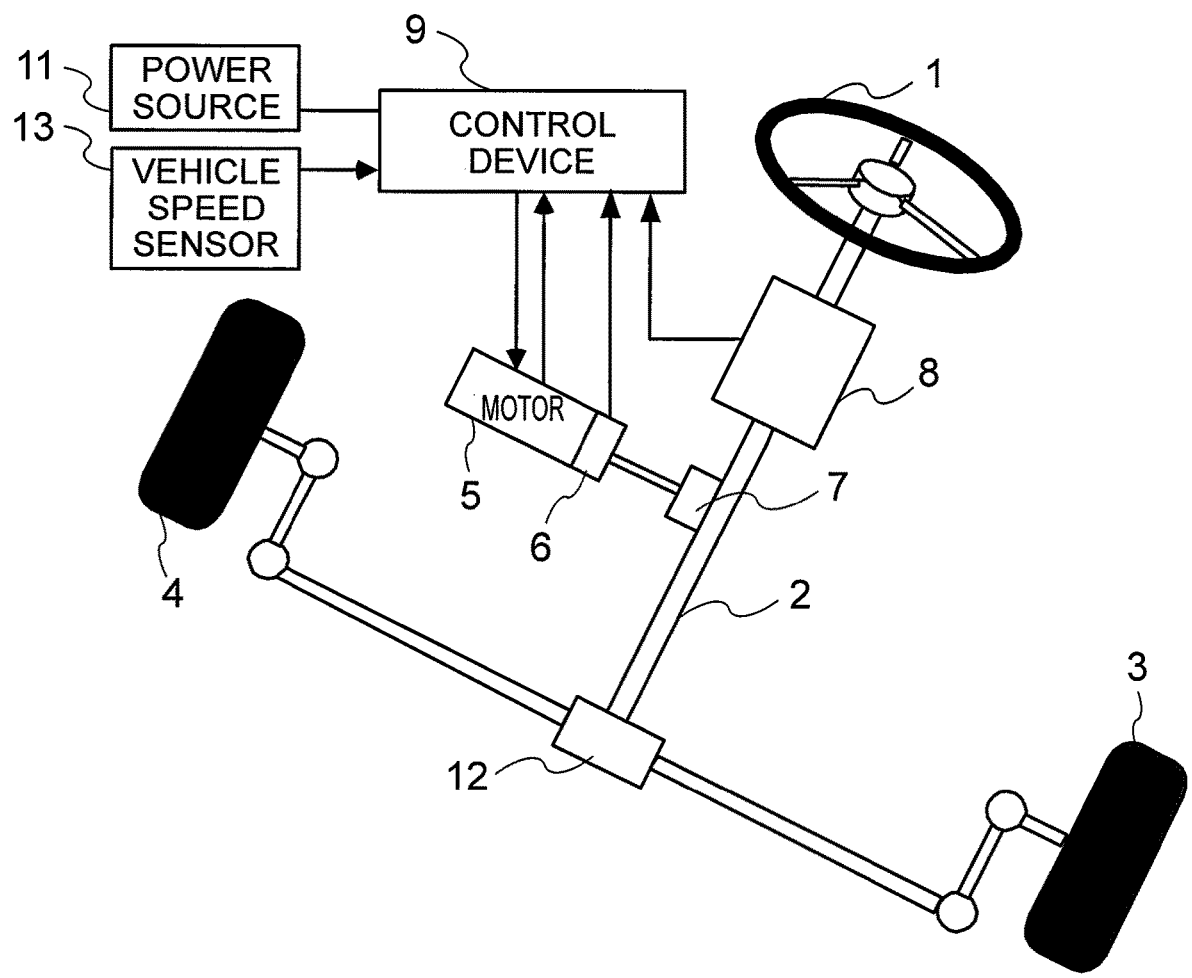
FIG. 1 is a configuration diagram for illustrating an electric power steering device according to a first embodiment of the present invention.

FIG. 1 is a configuration diagram for illustrating an electric power steering device according to a first embodiment of the present invention. In FIG. 1, the electric power steering device includes a steering wheel 1, a steering shaft 2, wheels 3 and 4, a motor 5, a motor rotational speed sensor 6, a motor deceleration gear 7, a torque sensor 8, a control device 9, a power source 11 being a battery, a rack and pinion gear 12, and a vehicle speed sensor 13.

Next, a description is given of an operation of the electric power steering device with reference to FIG. 1. A steering torque applied to the steering wheel 1 by a driver (not shown) is transmitted to a rack via the rack and pinion gear 12 through intermediation of a torsion bar of the torque sensor 8 and the steering shaft 2, to thereby turn the wheels 3 and 4.

The motor 5 is coupled to the steering shaft 2 via the motor deceleration gear 7. Further, an output torque generated by the motor 5 is transmitted to the steering shaft 2 via the motor deceleration gear 7 to alleviate the steering torque applied by the driver at the time of steering. An alternating current motor such as a permanent magnet synchronous motor or an induction motor, or a direct current motor is used as the motor 5.

The torque sensor 8 is configured to detect a steering torque applied to a shaft of the torque sensor 8 due to steering of the steering wheel 1 by the driver. Specifically, the steering torque causes torsion substantially proportional to the steering torque in the shaft of the torque sensor 8, and the torque sensor 8 detects a torsion angle, converts this torsion angle into a steering torque signal $\tau 0$, and outputs the steering torque signal $\tau 0$. The vehicle speed sensor 13 is configured to detect a traveling speed of a vehicle, and output a vehicle speed signal Vx. The motor rotational speed sensor 6 is configured to detect a motor rotational speed, and output a motor rotational speed signal $\omega m$.

The control device 9 is configured to determine a direction and magnitude of a current command Iref corresponding to an output torque output by the motor 5 based on the steering torque signal $\tau 0$ output by the torque sensor 8, the vehicle speed signal Vx output by the vehicle speed sensor 13, and the motor rotational speed signal $\omega m$ output by the motor rotational speed sensor 6. Further, the control device 9 is configured to use a current control unit described later to control a current to be caused to flow through the motor 5 from the power source 11 depending on the current command Iref in order to generate the output torque by the motor 5.

Figure 2:
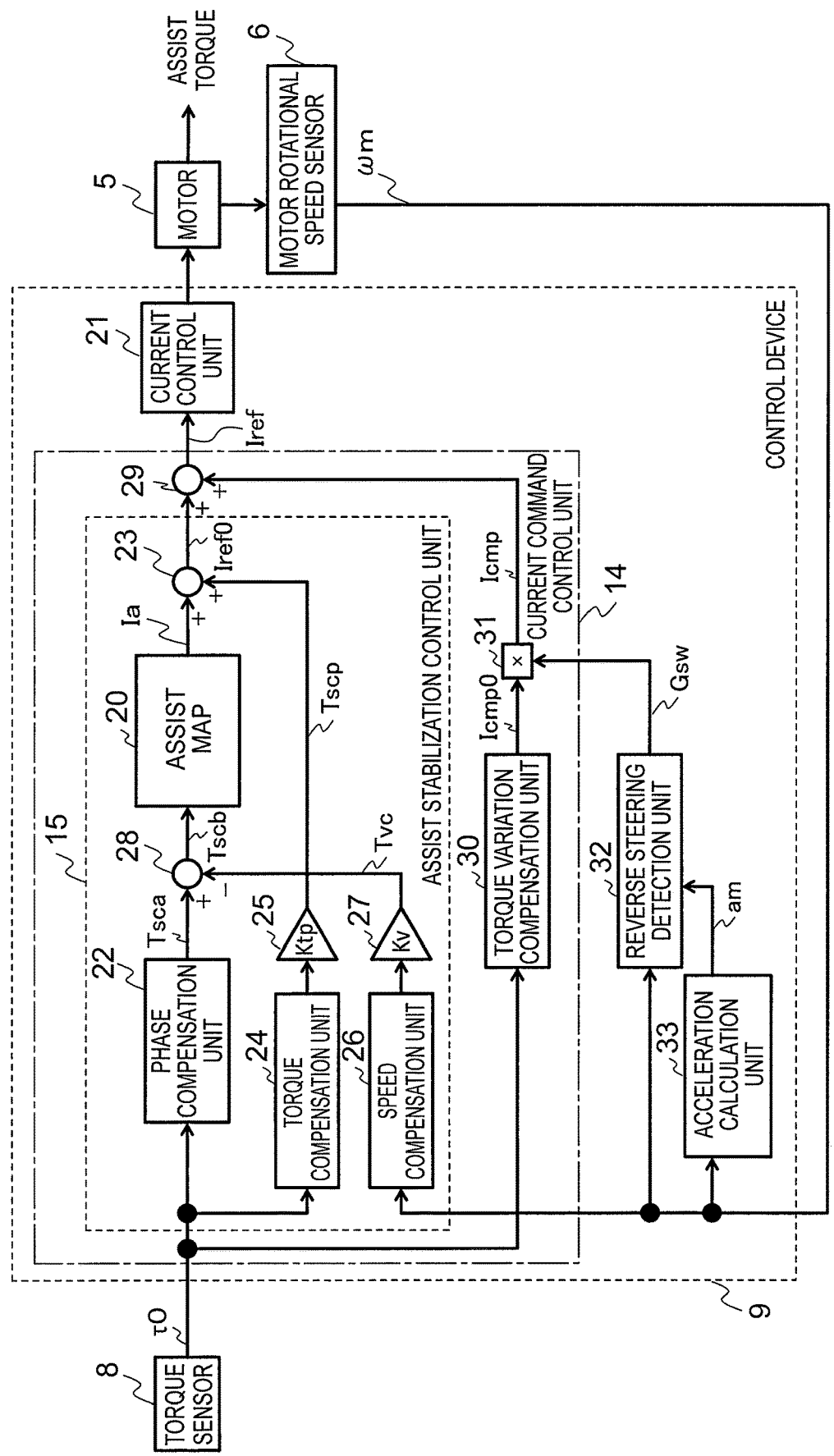
FIG. 2 is a block configuration diagram for illustrating a control device of an electric power steering device according to the first embodiment of the present invention.

FIG. 2 is a block configuration diagram for illustrating a control device of the electric power steering device according to the first embodiment of the present invention. In FIG. 2, the control device 9 includes a current command control unit 14, a current control unit 21, a reverse steering detection unit 32, and an acceleration calculation unit 33.

Components of the control device 9 are usually implemented as software of a microcomputer. Further, the microcomputer includes a central processing unit (CPU), a read-only memory (ROM), a random access memory (RAM), and an interface (IF), which are widely known. The microcomputer executes a predetermined control operation through execution of software by, for example, sequentially extracting programs stored in the ROM, performing a desired calculation by the CPU, and temporarily storing a calculation result into the RAM.

Next, a description is given of an operation of the control device 9 with reference to FIG. 2. The acceleration calculation unit 33 is configured to differentiate the motor rotational speed signal $\omega m$ to calculate a motor rotational acceleration signal am. The reverse steering detection unit 32 is configured to detect reverse steering based on the motor rotational speed signal $\omega m$ and the motor rotational acceleration signal am, and output a reverse steering switching gain Gsw. The current command control unit 14 is configured to output the current command Iref based on the steering torque signal $\tau 0$, the motor rotational speed signal $\omega m$, and the reverse steering switching gain Gsw.

The current command control unit 14 includes an assist stabilization control unit 15, an adder 29, a torque variation compensation unit 30, and a multiplier 31. The assist stabilization control unit 15 is configured to calculate a current command Iref0 before being subjected to reverse steering compensation based on the steering torque signal $\tau 0$ and the motor rotational speed signal $\omega m$.

The torque variation compensation unit 30 is configured to calculate a torque variation compensation current command Icmp0 based on the steering torque signal $\tau 0$. In this case, the torque variation compensation unit 30 sets, as the torque variation compensation current command, a signal obtained by reducing a steering frequency component of the driver in the steering torque signal $\tau 0$ and increasing the transfer gain by a higher frequency component.

The multiplier 31 is configured to multiply the torque variation compensation current command Icmp0 by the reverse steering switching gain Gsw, and calculate the new torque variation compensation current command Icmp. As described later, the reverse steering switching gain Gsw is a signal that takes the value of 1 when reverse steering is detected and takes the value of 0 when reverse steering is not detected. Therefore, the torque variation compensation current command Icmp takes a value other than 0 only when reverse steering is detected, and takes the value of 0 when reverse steering is not detected.

The adder 29 is configured to add the torque variation compensation current command Icmp to the current command Iref0, and output the current command Iref subjected to reverse steering compensation.

Next, a description is given of the assist stabilization control unit 15. In this case, the assist stabilization control unit 15 may have a related-art configuration, and in this description, has a configuration similar to that described in FIG. 19 of WO 2012/160850 A1, for example.

The assist stabilization control unit 15 includes an assist torque map 20, a phase compensation unit 22, an adder 23, a torque compensation unit 24, an assist parallel torque gain Ktp (25), a speed compensation unit 26, a speed control gain Kv (27), and a subtractor 28.

The phase compensation unit 22 is configured to execute gain compensation for decreasing or increasing a high-frequency gain on the steering torque signal τ0 output from the torque sensor 8 to calculate a compensated steering torque signal Tsca. In this case, the phase compensation unit 22 executes such gain compensation as to reduce a gain characteristic around a gain cross-over frequency of a closed loop transfer function for an assist torque.

The subtractor 28 is configured to subtract a motor speed compensation command Tvc described later from the compensated steering torque signal Tsca to correct the steering torque signal, and calculate a corrected steering torque signal Tscb.

Next, in the assist map 20, an assist current command Ia corresponding to the assist torque is calculated based on the corrected steering torque signal Tscb. The assist current command Ia is also referred to as an "assist torque signal" or an "assist command". The vehicle speed signal Vx is also input to the assist map 20, and an input/output characteristic of the assist map is changed depending on the vehicle speed.

The speed compensation unit 26 is configured to output a motor rotational speed signal Svc compensated by a high-pass filter and low-pass filter based on the motor rotational speed signal ωm. Further, the compensated motor rotational speed signal Svc is multiplied by the speed control gain Kv (27), which is a feedback gain of motor rotational speed feedback, to calculate the motor speed compensation command Tvc.

The torque compensation unit 24 has a high-pass filter characteristic for reducing the steering frequency component, and is configured to calculate an assist parallel steering torque signal Tsp with which the steering torque signal τ0 output from the torque sensor 8 is compensated. Further, the assist parallel steering torque signal Tsp is multiplied by an assist parallel torque gain Ktp (34) to calculate an assist parallel steering torque compensation command Tscp.

The adder 23 is configured to add the assist parallel steering torque compensation command Tscp to the assist current command Ia output from the assist map 20 to calculate the current command Iref0. The torque compensation unit 24 may have a phase compensation characteristic for compensating for a phase characteristic in addition to the high-pass filter characteristic. In this case, a degree of freedom enabling optimization of the frequency characteristic of the steering torque signal is added, and thus it is possible to obtain a more effective feedback characteristic.

In the example of the assist stabilization control unit 15 described above, the steering torque signal τ0 and the motor rotational speed signal ωm are input to output the current command Iref0. However, the motor rotational speed signal ωm may not be used as input. For example, the speed compensation unit 26, the speed control gain Kv (27), and the subtractor 28 may be removed from the assist stabilization control unit 15, and the assist parallel torque gain Ktp (25) may be set to a larger value instead, to thereby obtain a stabilization effect. That is, the assist stabilization control unit 15 and the current command control unit 14 may be configured to receive only the steering torque signal τ0 as input.

Further, in addition to the assist stabilization control unit 15 described above, generally used compensation control such as inertia compensation control for compensating for an influence of increase in motor inertia at the steering frequency or viscosity compensation control for increasing the viscosity at the steering frequency may be added to or decreased from the assist current command Ia, for example, to thereby correct the assist current command Ia.

Figure 3:
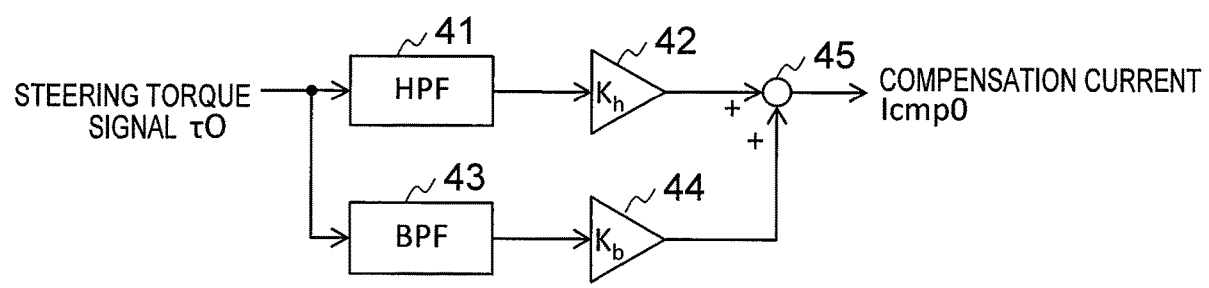
FIG. 3 is a block configuration diagram for illustrating a torque variation compensation unit of the electric power steering device according to the first embodiment of the present invention.

Next, a description is given of the torque variation compensation unit 30 with reference to FIG. 3. FIG. 3 is a block configuration diagram for illustrating the torque variation compensation unit of the electric power steering device according to the first embodiment of the present invention. In FIG. 3, the torque variation compensation unit 30 includes a high-pass filter 41, a control gain Kh (42), a band-pass filter 43, a control gain Kb (44), and an adder 45.

The steering torque signal τ0 output from the torque sensor 8 is compensated by the high-pass filter 41 to reduce the steering frequency component while obtaining an advancement effect of the steering torque. Then, the compensated steering torque signal τ0 is multiplied by the control gain Kh (42).

Further, the steering torque signal τ0 output from the torque sensor 8 is compensated by the band-pass filter 43 to reduce the steering frequency component while obtaining an effect of passing a band of frequency components of torque variation at the time of reverse steering to reduce a higher frequency component. Then, the compensated steering torque signal τ0 is multiplied by the control gain Kb (44).

Next, output of the control gain Kh (42) and output of the control gain Kb (44) are added up by the adder 45, and an added signal is output as the torque variation compensation current command Icmp0.

Next, a description is given of the acceleration calculation unit 33 illustrated in FIG. 2. The acceleration calculation unit 33 is configured to differentiate the motor rotational speed signal ωm, subject the differentiated motor rotational speed signal ωm to low-pass filter processing of reducing a high-frequency component in order to remove a noise, and output the motor rotational acceleration signal am. This low-pass filter is set to pass the steering frequency component, and reduce a frequency component higher than that in torque variation at the time of reverse steering. The accuracy of detecting reverse steering is improved more by executing low-pass filter processing than in the case of not employing a low-pass filter.

Figure 4:
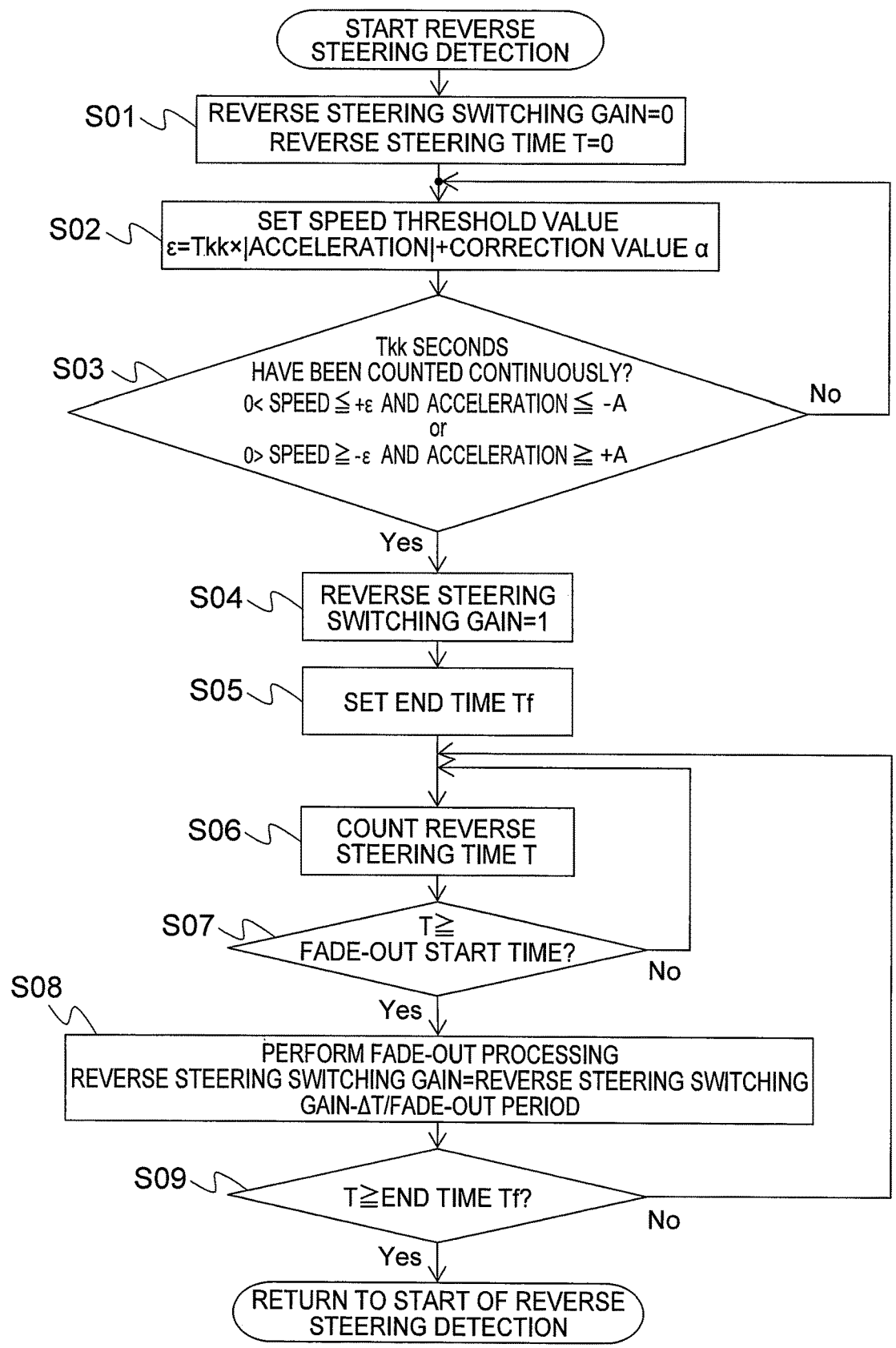
FIG. 4 is a flowchart for illustrating processing of a reverse steering detection unit in the electric power steering device according to the first embodiment of the present invention.

Next, a description is given of an operation of the reverse steering detection unit 32 with reference to the flowchart of FIG. 4. FIG. 4 is a flowchart for illustrating processing to be executed by the reverse steering detection unit of the electric power steering device according to the first embodiment of the present invention.

In FIG. 4, first, initial values of variables are set in Step S01. Specifically, the reverse steering switching gain and a reverse steering time T are set to 0.

Next, in Step S02, a speed threshold ε being a set speed is set. The speed threshold ε is set by the following expression through use of a determination time Tkk for counting time to determine that reverse steering is being performed, the motor rotational acceleration am, and a correction value α.

$$\varepsilon = Tkk \times |am| + \alpha$$

That is, the speed threshold ε is a value obtained by adding the correction value α to a product of the magnitude of the motor rotational acceleration am and the determination time Tkk for the counting, which is proportional to the magnitude of the motor rotational acceleration am.

Next, in Step S03, it is determined whether a determination satisfaction state is satisfied for the determination time Tkk (in seconds) or more continuously. The determination satisfaction state is a state in which the magnitude of the motor rotational speed ωm is equal to or smaller than a set speed, the motor rotational acceleration am is in a direction of causing the motor rotational speed ωm to become 0, and the magnitude of the motor rotational acceleration am is equal to or larger than a set acceleration A.

This determination satisfaction state is premised on the satisfaction of any one of the following two conditions to be satisfied depending on the direction of the motor rotational speed ωm.

1. When the motor rotational speed ωm is positive, the determination satisfaction state is satisfied when the motor rotational speed ωm has a value equal to or smaller than the speed threshold ε and the motor rotational acceleration am has a value equal to or smaller than an acceleration threshold value −A.

2. When the motor rotational speed ωm is negative, the determination satisfaction state is satisfied when the motor rotational speed ωm has a value equal to or larger than the speed threshold −ε and the motor rotational acceleration am has a value equal to or larger than the acceleration threshold value A.

In this manner, although the two conditions are provided in terms of the sign of the motor rotational speed ωm, the determination condition is set without detecting reverse of the sign of a signal. Further, the direction and magnitude of the motor rotational acceleration are determined by changing the sign of the acceleration threshold value depending on the sign of the motor rotational speed ωm. For example, the speed is determined to be low when the motor rotational speed is negative and equal to or higher than the speed threshold ε. Then, when the motor rotational acceleration am is equal to or larger than the acceleration threshold value A, the motor rotational speed is determined to be transitioning from negative to 0 at the positive acceleration.

Further, in Step S03, when the determination satisfaction state is satisfied for the determination time Tkk (in seconds) or more continuously, reverse steering is determined to have started, and the processing proceeds to Step S04. When the determination satisfaction state is not satisfied, the processing returns to Step S02 to update the speed threshold value. The determination time Tkk is only required to be prevented from being erroneously satisfied due to a noise, and may be set to an extremely short period of time, for example, 0.1 second or less.

Next, in Step S04, the reverse steering switching gain is set to 1. Further, in Step S05, a reverse steering end time Tf is set. In this embodiment, the end time Tf is only required to be set to a fixed value on the same order of a torque variation period at the time of reverse steering, and may be determined based on a period of time until the torque variation at the time of reverse steering has attenuated.

Next, in Step S06, the reverse steering time T is counted at a counting period ΔT. That is, the counting period ΔT is added to the previous reverse steering time T.

Next, in Step S07, it is determined whether the reverse steering time T is equal to or larger than a fade-out start time. When the reverse steering time T is equal to or larger than the fade-out start time, the processing proceeds to Step S08, while when the reverse steering time T is not equal to or larger than the fade-out start time, the processing returns to Step S06.

Next, in Step S08, fade-out processing for the reverse steering switching gain is executed. Specifically, a value obtained by dividing the counting period ΔT by a fade-out period is subtracted from the previous reverse steering switching gain, and the obtained value is set as the present reverse steering switching gain. With this, the reverse steering switching gain attenuates to 0 in proportion to time.

Next, in Step S09, it is determined whether or not the reverse steering time T is equal to or larger than the end time Tf, and when the reverse steering time T is equal to or larger than the reverse steering end time Tf, the processing is temporarily ended to start detection of reverse steering again. When the reverse steering time T is not equal to or larger than the reverse steering end time Tf, the processing returns to Step S06.

Figure 5:
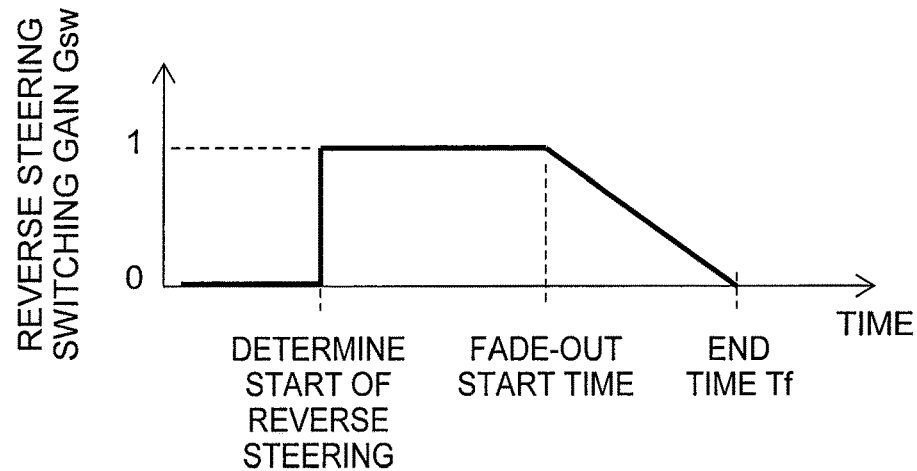
FIG. 5 is a graph for showing a chronological waveform of a reverse steering switching gain in the electric power steering device according to the first embodiment of the present invention.

The temporal waveform of the reverse steering switching gain Gsw that follows this flowchart is shown in FIG. 5. In FIG. 5, when start of reverse steering is determined, the reverse steering switching gain rises from 0 to 1, and when a period of time that has elapsed since the start of reverse steering reaches the fade-out start time, the reverse steering switching gain attenuates in proportion to time and becomes 0 when the end time Tf has elapsed.

Figure 6:
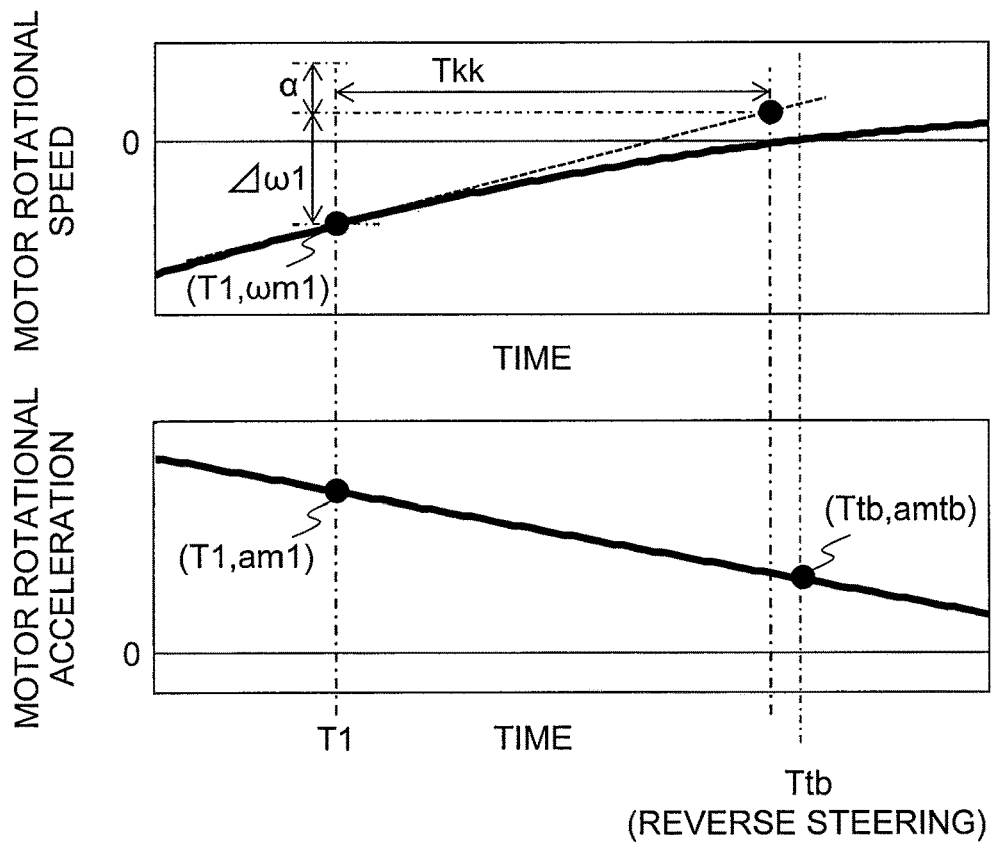
FIG. 6 is a graph for showing time response waveforms of a motor rotational speed and a motor rotational acceleration at the time of detection of reverse steering in the electric power steering device according to the first embodiment of the present invention.

Next, a description is given in detail of a logic and effect of detecting start of reverse steering with reference to FIG. 6, in which an example of time response waveforms of the motor rotational speed ωm and the motor rotational acceleration am at the time of detection of reverse steering is shown. In this case, there is shown a case in which the motor rotational speed ωm before reverse steering is negative, and the motor rotational acceleration am is positive and decreases as time passes.

In FIG. 6, the motor rotational speed crosses zero at the time Ttb to have an opposite sign, and reverse steering occurs. Further, at the time T1, it is assumed that the motor rotational acceleration is am1 and the motor rotational speed is ωm1. The motor rotational acceleration am1 is assumed to be larger than the acceleration threshold value. At this time, when the acceleration is assumed to be a fixed value in a product of the acceleration and the determination time Tkk, namely, Tkk×|am1|, the magnitude of the motor rotational speed ωm1 that changes during Tkk (in seconds), namely, a speed change prediction amount Δω1 can be represented by the following expression.

$$\Delta\omega 1 = Tkk \times |am1|$$

As shown in FIG. 6, the magnitude of the motor rotational speed ωm1 is smaller than the speed change prediction amount Δω1, which means that the motor rotational speed ωm1 is lower than −Δω1 in consideration of the sign. Thus, reverse steering start determination Step S03 is satisfied.

Further, at the time of reverse steering, in general, the motor rotational acceleration changes within the determination time, which is an extremely short period of time, and a rotational jerk is not large. In FIG. 6, speed change prediction (broken line of FIG. 6) on the assumption that the motor rotational acceleration is a fixed value has successfully predicted a true value indicated by the solid line without much difference at the reverse steering time Ttb although the motor rotational acceleration is set to be a large value for convenience. This indicates the fact that the timing of reverse steering can be detected accurately.

Figure 7:
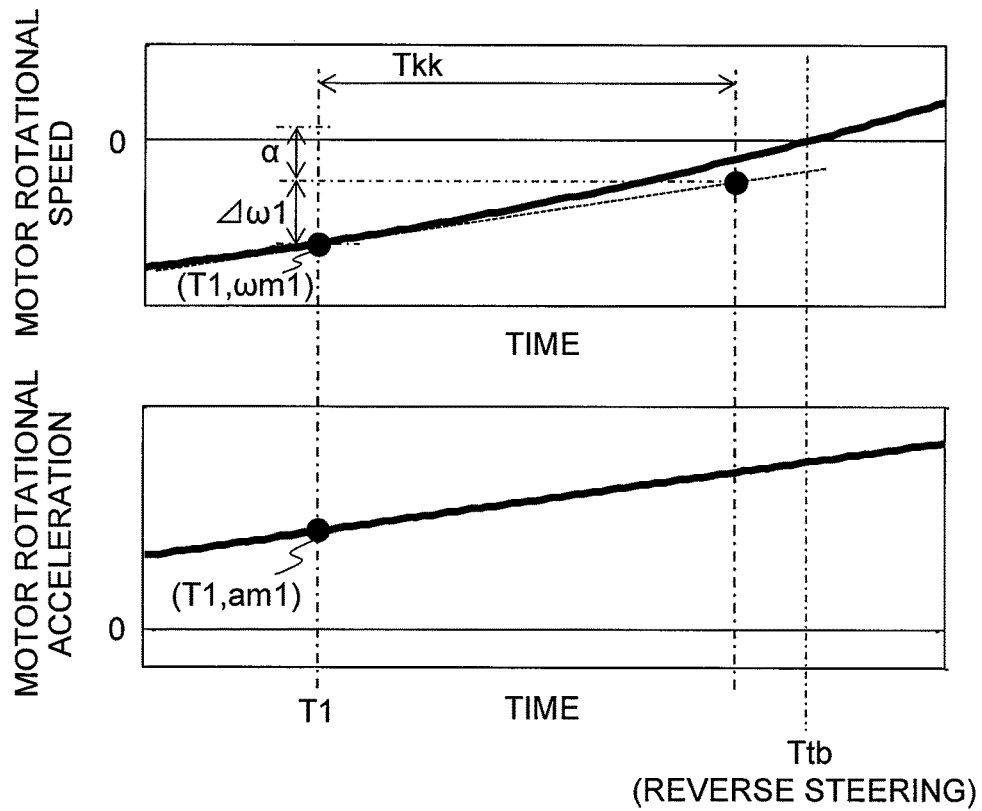
FIG. 7 is a graph for showing the time response waveforms of the motor rotational speed and the motor rotational acceleration at the time of detection of reverse steering in the electric power steering device according to the first embodiment of the present invention.

Now, a description is given in detail of a logic and effect of detecting start of reverse steering with reference to FIG. 7, in which another example of time response waveforms of the motor rotational speed ωm and the motor rotational acceleration am at the time of detection of reverse steering is shown. In this case, there is shown a case in which the motor rotational speed ωm before reverse steering is negative, and the motor rotational acceleration am is positive and increases as time passes.

In FIG. 7, the motor rotational speed crosses zero at the time Ttb to have an opposite sign, and reverse steering occurs. Further, at the time T1, it is assumed that the motor rotational acceleration is am1 and the motor rotational speed is ωm1. The motor rotational acceleration am1 is assumed to be larger than the acceleration threshold value. At this time, when the acceleration is assumed to be a fixed value in the product of the acceleration and the determination time Tkk, namely, Tkk×|am1|, the magnitude of the motor rotational speed ωm1 that changes during Tkk (in seconds), namely, the speed change prediction amount Δω1 can be represented.

As shown in FIG. 7, the magnitude of the motor rotational speed ωm1 is smaller than a sum of the speed change prediction amount Δω1 and the correction value α, namely, a speed threshold ε1, which means that the motor rotational speed ωm1 is lower than −(Tkk×|am1|+α) in consideration of the sign. Thus, reverse steering start determination Step S03 is satisfied. In this case, the correction value α is only required to be defined based on the upper limit of the jerk in consideration of an error due to a change in acceleration.

When FIG. 6 and FIG. 7 are compared with each other, the speed change prediction amount Δω1 is larger in FIG. 6. This is because the motor rotational acceleration at the time T1 is larger in FIG. 6 than in FIG. 7. When the speed threshold value is set to a fixed value, this setting is required to follow the larger acceleration of FIG. 6. Then, when the speed threshold value is applied to the case of the smaller acceleration of FIG. 7, the speed threshold value is too large, with the result that reverse steering is determined much earlier than the actual time of reverse steering and the reverse steering switching gain is increased excessively. In this manner, the speed threshold value being a set speed is set to a value substantially proportional to the motor rotational acceleration, to thereby be capable of detecting the timing of reverse steering accurately and minimizing a period required for enabling torque variation compensation.

Further, it is possible to detect reverse steering accurately by comparing the motor rotational speed with a speed threshold value having a predetermined magnitude without detecting a moment at which the speed crosses zero to have an opposite sign.

Figure 8:
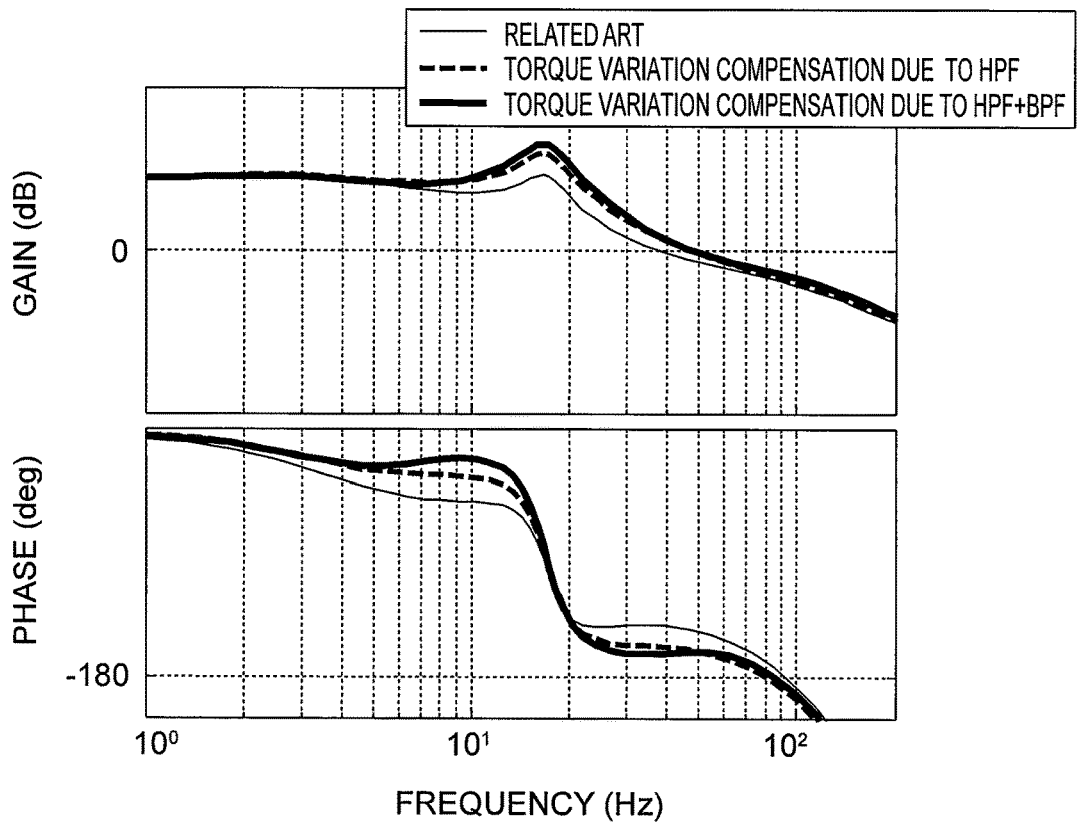
FIG. 8 is a Bode plot for showing an open loop transfer function in the electric power steering device according to the first embodiment of the present invention.

Next, a description is given of an action in the open loop transfer function of the torque variation compensation unit 30 at a time when the reverse steering switching gain is 1 with reference to FIG. 8, in which an open loop transfer function in the electric power steering device starting from the steering torque to the assist torque and returning to the steering torque via a steering mechanism is shown. In FIG. 8, the thin solid line indicates a case in which there is no related-art torque variation compensation unit, while the thick solid line indicates the open loop transfer function of the torque variation compensation unit 30 in this embodiment.

In FIG. 8, from the viewpoint of the gain characteristic, it is found that the gain increases in a bandwidth around 10 Hz to 50 Hz compared to a case in which there is no torque variation compensation unit. That is, the frequency component of steering torque variation at the time of reverse steering is mainly around 10 Hz to 50 Hz, and thus the transfer gain in this bandwidth is caused to increase. Stability such as a phase margin or a gain margin decreases slightly as compared to the related art. However, required stability is ensured within a short period of time of reverse steering, and decrease in stability is minimized.

In this manner, it is possible to increase the gain characteristic of the open loop transfer function in the frequency bandwidth of steering torque variation by adding a torque variation compensation current command given by the torque variation compensation unit 30 to an original current command and increasing the transfer gain from input to output by the current command control unit 14 in that frequency bandwidth. As a result, it is possible to suppress transmission of a disturbance in the frequency bandwidth to the steering wheel. Further, the gain of the open loop transfer function can be increased in a frequency bandwidth equal to or smaller than the cross-over frequency to transmit a current command substantially opposite to the disturbance as a feedback, so that an action of canceling the disturbance can be obtained.

Figure 9:
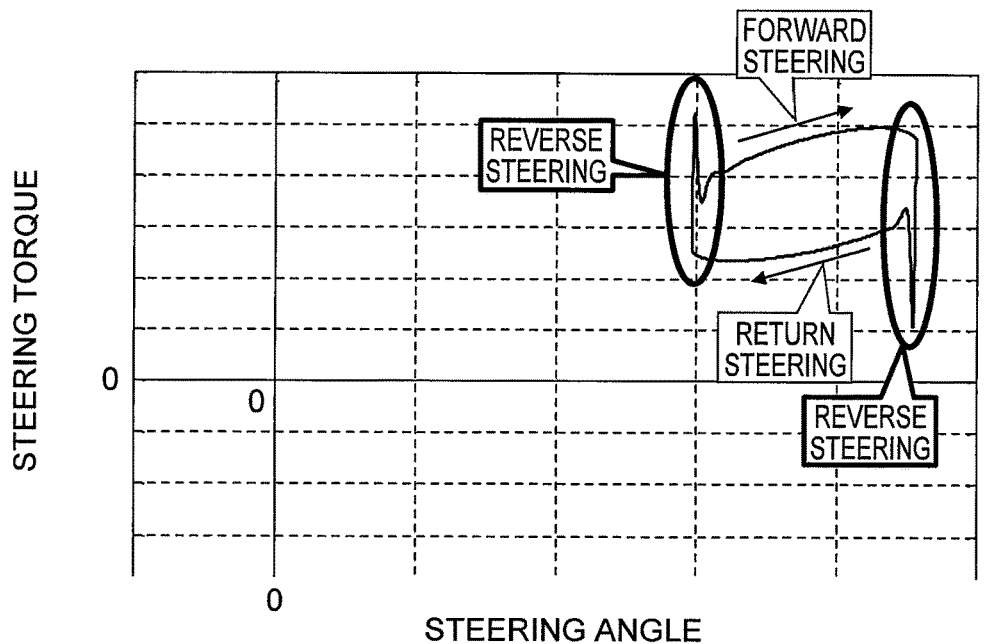
FIG. 9 is a graph for showing a Lissajous waveform formed by a steering angle and a steering torque at the time of corrective steering during turning of a vehicle in a related-art electric power steering device.

FIG. 9 is a graph for showing a Lissajous waveform formed by the steering angle and the steering torque at the time of corrective steering during turning of the vehicle in a related-art electric power steering device. Specifically, in FIG. 9, a steering Lissajous waveform at a time when steering of finely correcting the steering angle during turning of the vehicle, namely, corrective steering is performed is shown.

In FIG. 9, the arrow direction indicates the flow of time. The flow of FIG. 9 is as follows. Specifically, a segment pointing in the right upper direction indicates forward steering, and a segment enclosed by the thick oval indicates reverse steering. After that, a segment pointing in the left bottom direction indicates transition to return steering, and after that, reverse steering occurs to return to forward steering again.

At the time of reverse steering, there is a portion at which the steering torque protrudes like a horn, and this horn indicates steering torque variation that occurs due to the reverse of the friction torque at the time of reverse steering. It is found from FIG. 9 that it is required to suppress torque variation by detecting not only reverse steering after forward steering but also reverse steering after return steering.

Figure 10:
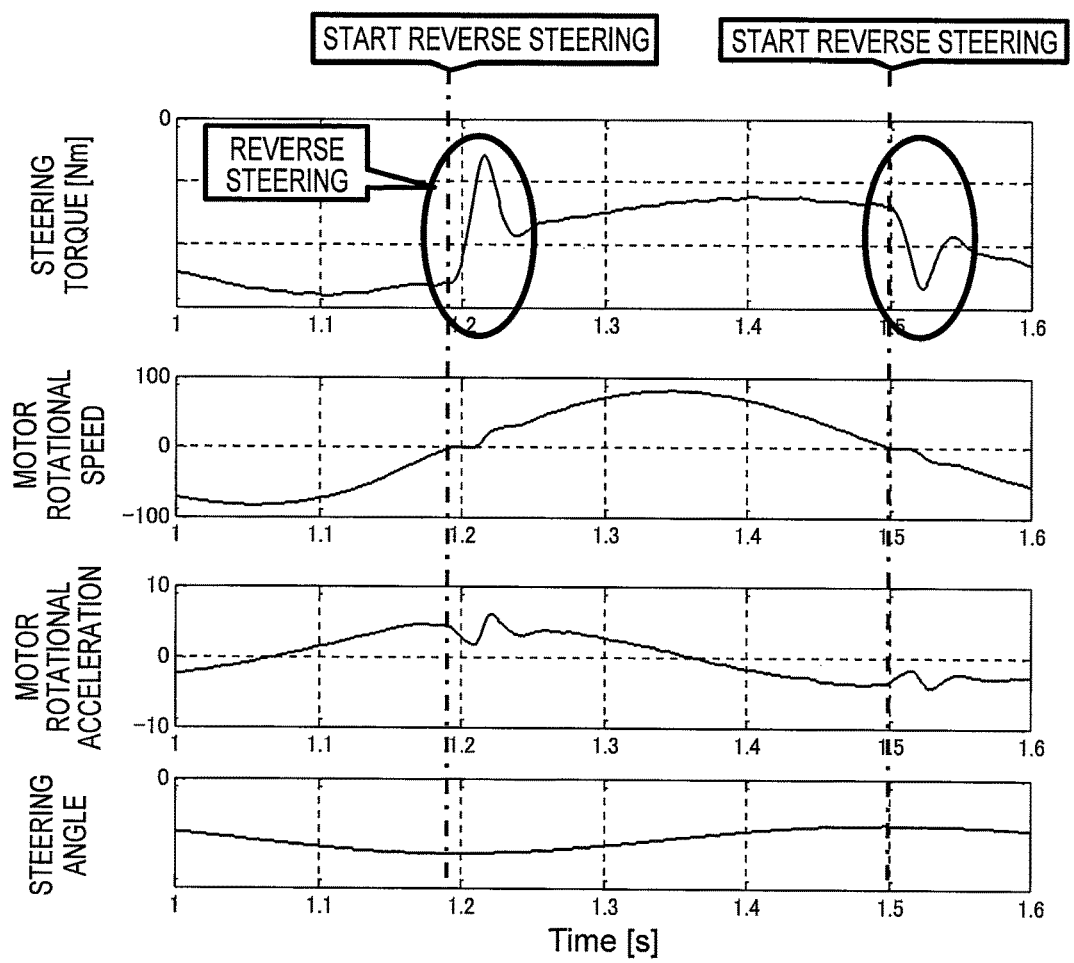
FIG. 10 is a graph for showing time response waveforms at the time of reverse steering in the related-art electric power steering device.
Figure 11:
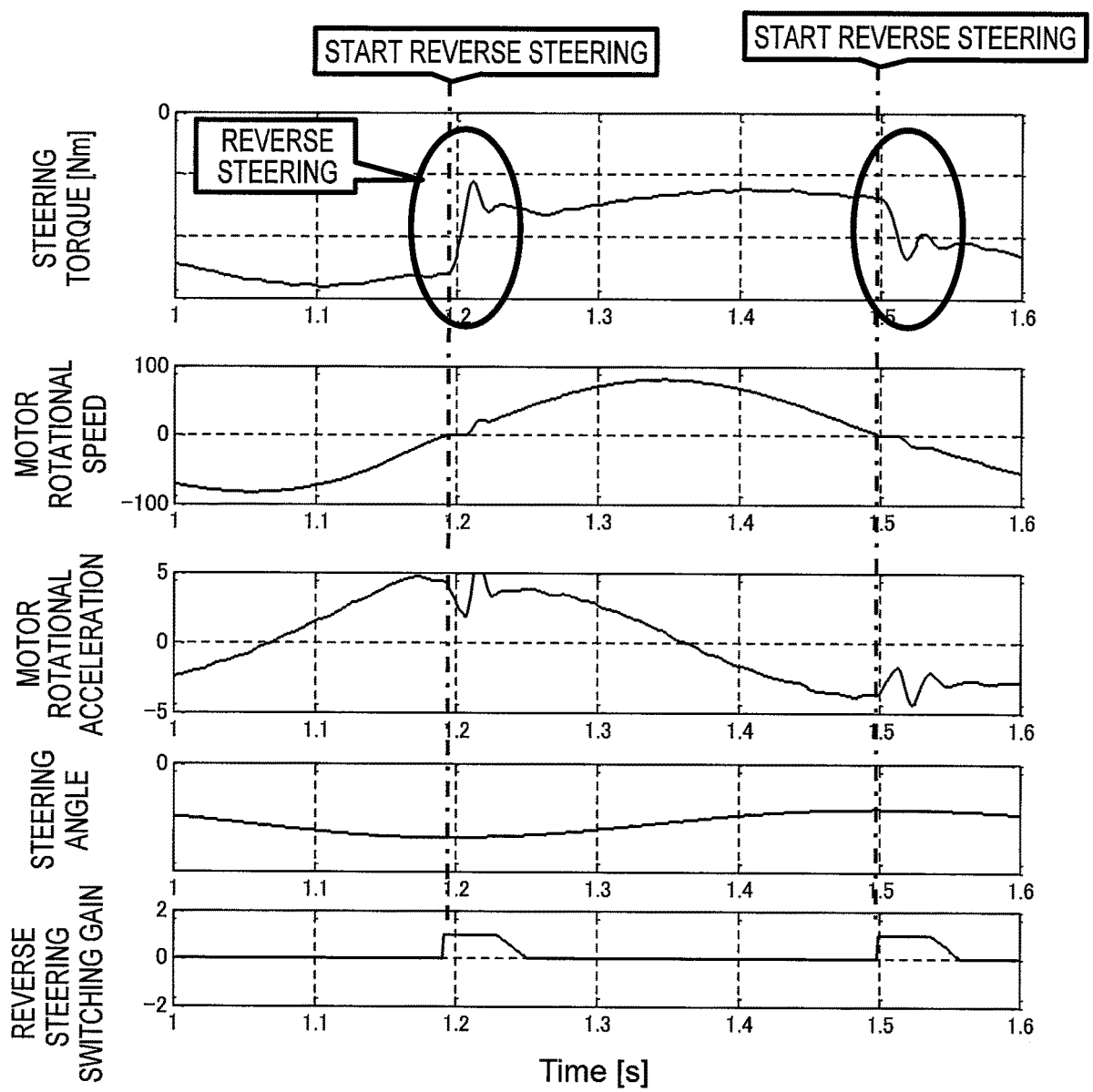
FIG. 11 is a graph for showing the time response waveforms at the time of reverse steering in the electric power steering device according to the first embodiment of the present invention.

Next, a description is given of an effect of this embodiment with reference to FIG. 10 and FIG. 11, in which time response waveforms at the time of corrective steering are shown. In FIG. 10, a waveform obtained by the related-art configuration without the torque variation compensation unit is shown, and in FIG. 11, a waveform obtained by the configuration in this embodiment is shown.

In FIG. 10 and FIG. 11, reverse steering occurs after forward steering at around 1.19 seconds, and reverse steering occurs after return steering at around 1.5 seconds. In the case of the related-art example of FIG. 10, extremely large toque variation of the steering torque protruding like a horn occurs for about one scale. However, with this embodiment of FIG. 11, steering torque variation is suppressed to about 30% to 40% of one scale.

Further, as shown at the bottom of FIG. 11, it is found that the reverse steering switching gain rises from 0 to 1 at substantially the same timing as a reverse steering start time at which the motor rotational speed starts to cross zero, and reverse steering is detected accurately. Further, after reverse steering is determined to have started, the reverse steering switching gain attenuates from 1 to 0 when torque variation ends, which means that excessive vibration is prevented in a segment other than reverse steering.

In addition to the method of directly calculating the rotational angle of a rotation shaft of the motor 5, there is a method of using a motor rotational angle sensor and a speed calculator as the method of obtaining the motor rotational speed signal ωm. For example, the motor rotational angle sensor may be constructed by a resolver or an encoder, and an amount of change in motor rotational angle signal θm per predetermined time may be acquired to calculate the motor rotational speed based on the change amount. That is, the motor rotational speed detection unit may be constructed by a combination of a motor rotational angle sensor and a speed calculator, or by a motor rotational speed detection sensor.

In this embodiment, the torque variation compensation unit 30 is constructed by two compensators, namely, the high-pass filter 41 and the band-pass filter 43. However, a close effect is obtained even without the band-pass filter 43. That is, the characteristic indicated by the broken line of the open loop transfer function shown in FIG. 8 indicates the effect, and a close effect is obtained although the magnitude of the gain characteristic is a little inferior to the case of providing a band-pass filter in the frequency bandwidth of torque variation. Therefore, it is also possible to suppress steering torque variation at the time of reverse steering.

As described above, according to the first embodiment of the present invention, there is provided an electric power steering device, including: a motor configured to output a torque based on a steering torque of a driver; a motor rotational speed detection unit configured to detect a rotational speed of the motor; an acceleration calculation unit configured to calculate a rotational acceleration of the motor based on the rotational speed of the motor; a reverse steering detection unit configured to determine start of reverse steering when a magnitude of the rotational speed of the motor is equal to or smaller than a set speed, the rotational acceleration of the motor is in a direction of causing the rotational speed of the motor to become 0, and a magnitude of the rotational acceleration of the motor is equal to or larger than a set acceleration; and a current command control unit configured to output a current command for the motor based on the steering torque or the rotational speed of the motor, in which the current command control unit is configured to increase a transfer gain from input to output by the current command control unit when the reverse steering detection unit determines start of the reverse steering.

Thus, reverse steering is detected based on the magnitude of the motor rotational speed and the direction and magnitude of the motor rotational acceleration without based on the reverse of the sign of the motor rotational speed or the reverse of the sign of the steering torque. Therefore, it is possible to detect reverse steering accurately while avoiding erroneous detection or chattering due to the noise of a signal or vibration.

Further, reverse steering at such a small acceleration that steering torque variation does not occur is not detected. Thus, the transfer gain is not excessively increased, and decrease in stability is minimized. That is, the transfer gain from input to output by the current command control unit is increased at the time of sophisticated and accurate detection of reverse steering. Therefore, it is possible to obtain a significant effect of greatly suppressing steering torque variation at the time of reverse steering without excessively decreasing the stability of the control system, which is not obtained in the related art.

Further, the speed threshold value being a set speed is set based on a value substantially proportional to the motor rotational acceleration. Thus, it is possible to: predict an amount of change in motor rotational speed during an extremely short period of time for determination based on the motor rotational acceleration; determine that the motor rotational speed is close to 0 based on the speed change prediction amount; and determine start of reverse steering accurately at a moment at which the motor rotational speed crosses zero. That is, it is possible to accurately detect the start timing of reverse steering.

Further, the transfer gain from input to output by the current command control unit is set to be increased after the reverse steering detection unit determines start of reverse steering until a set period in which torque variation at the time of reverse steering occurs ends. Therefore, it is possible to change the transfer gain only within the minimum required period after reverse steering, and prevent the stability of the control system from decreasing excessively.

Further, the current command control unit includes a torque variation compensation unit configured to receive input of the steering torque and output a compensation current, and the control device is configured to increase the transfer gain from input to output by the current command control unit by correcting the current command by the compensation current. Thus, the torque variation compensation unit can be designed independently of the assist stabilization control unit to obtain an optimum configuration for suppressing torque variation. Therefore, it is possible to greatly reduce steering torque variation.

Further, as in this embodiment, when the torque variation compensation unit includes a band-pass filter or a high-pass filter configured to pass the frequency bandwidth of torque variation at the time of reverse steering, the transfer gain can be increased efficiently in the frequency bandwidth of torque variation and an influence on other frequencies is likely to be suppressed. Therefore, it is possible to obtain an effect of suppressing steering torque variation to the maximum extent possible while ensuring the stability.

Second Embodiment

Figure 12:
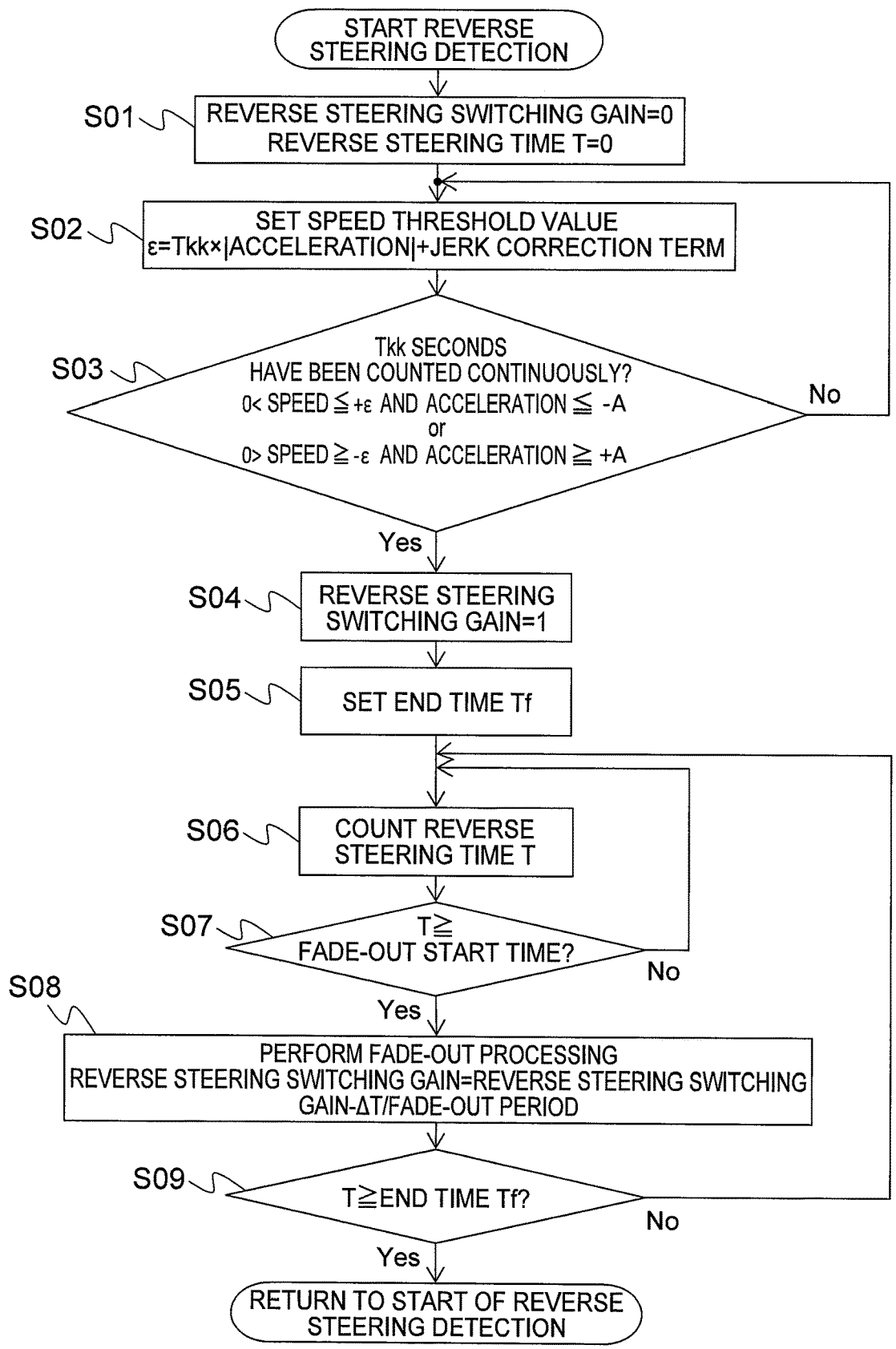
FIG. 12 is a flowchart for illustrating processing of a reverse steering detection unit in an electric power steering device according to a second embodiment of the present invention.

Now, a description is given of an electric power steering device according to a second embodiment of the present invention with reference to FIG. 12. In this case, a difference from the first embodiment is that a jerk correction term is added to setting of the speed threshold ε in Step S02 of FIG. 12, and other parts are the same as those of the first embodiment. Thus, a description thereof is omitted, and only the difference is described.

As shown in FIG. 6 and FIG. 7, when the motor rotational acceleration am is changing, a derivative of the motor rotational acceleration am, namely, a motor rotational jerk jm is used to correct the speed change prediction amount $\Delta\omega 1$ by the following expression, to thereby be able to detect reverse steering at a more accurate timing.

$$\Delta\omega 1 = Tkk \times |am1| + \tfrac{1}{2} \times |jm| \times Tkk^2$$

When it is assumed that the motor rotational jerk jm is a fixed value during the determination period, the speed variation amount can be represented by a sum of the product of the acceleration and the determination time Tkk, namely, $Tkk \times |am1|$, and half the product of the motor rotational jerk jm and the square of the determination time Tkk. Therefore, this speed variation amount and the speed threshold ε can be set to the speed change prediction amount $\Delta\omega 1$ and $\Delta\omega + \alpha$, respectively, to thereby reduce an error due to the influence of the jerk.

In this manner, the speed threshold value being a set speed is set based on the value substantially proportional to the motor rotational acceleration. Thus, it is possible to: predict the amount of change in motor rotational speed during an extremely short period of time for determination based on the motor rotational acceleration; determine that the motor rotational speed is close to 0 based on the speed change prediction amount; and determine start of reverse steering accurately at a moment at which the motor rotational speed crosses zero. That is, it is possible to accurately detect the start timing of reverse steering.

Third Embodiment

Figure 13:
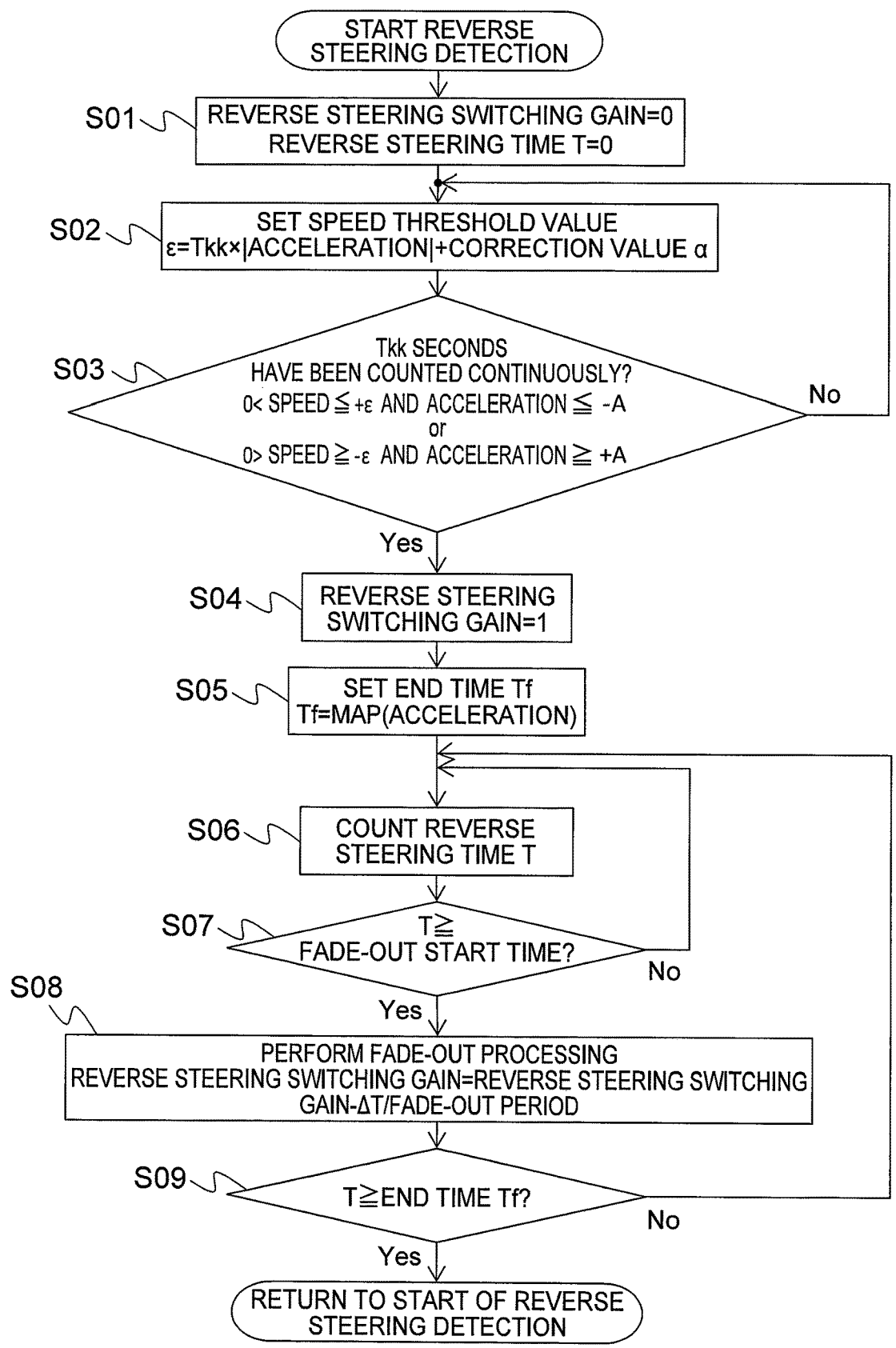
FIG. 13 is a flowchart for illustrating processing of a reverse steering detection unit in an electric power steering device according to a third embodiment of the present invention.
Figure 14:
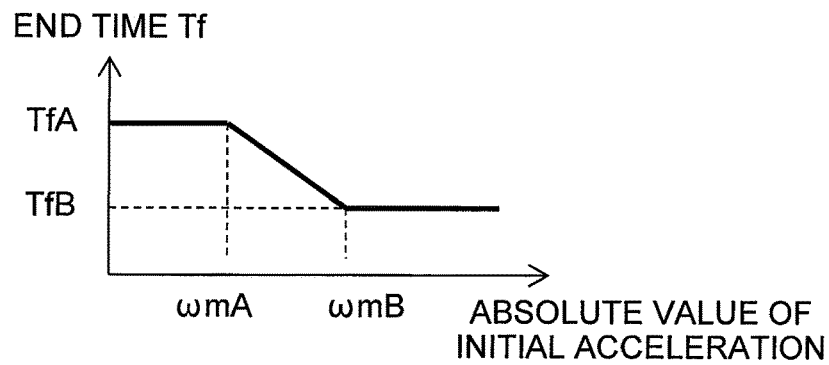
FIG. 14 is a graph for showing a relationship between an absolute value of an initial acceleration and an end time of reverse steering relating to setting of the end time in the electric power steering device according to the third embodiment of the present invention.
Figure 15:
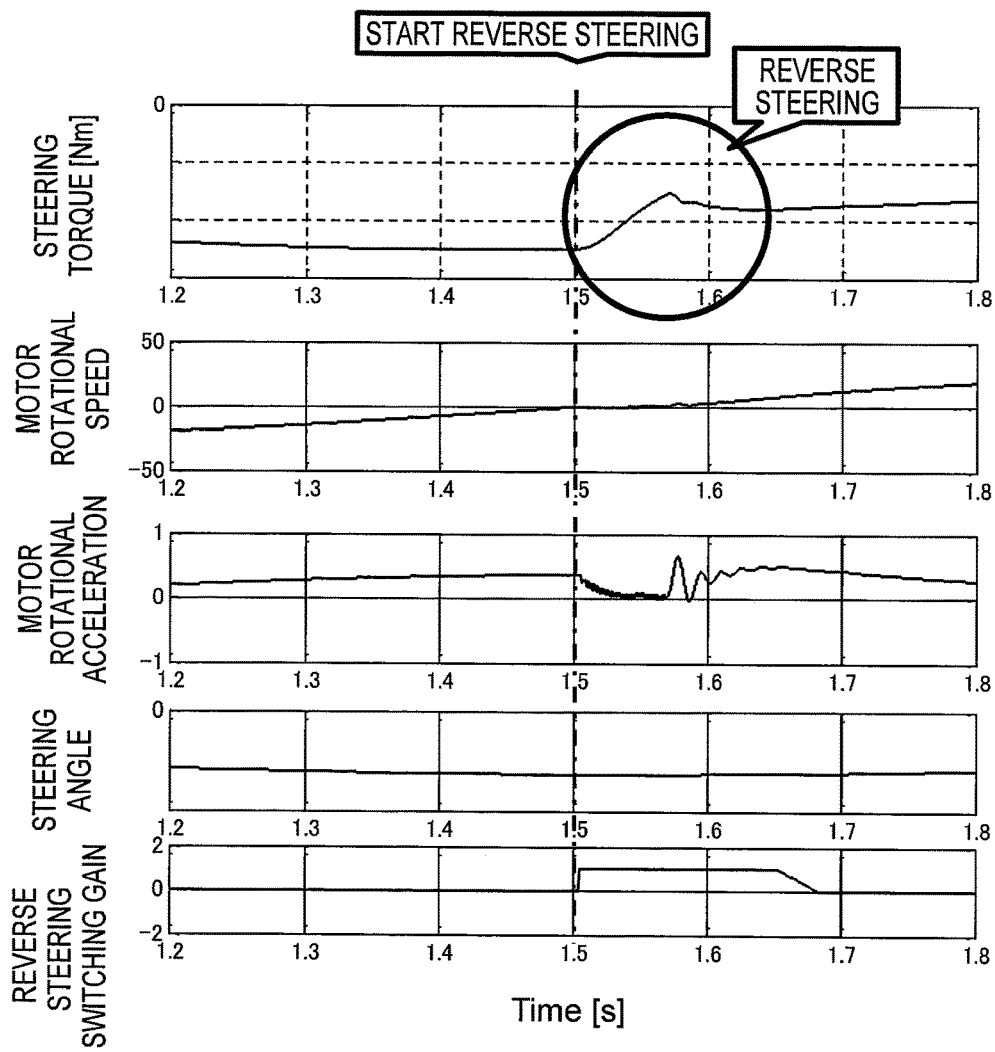
FIG. 15 is a graph for showing time response waveforms at the time of reverse steering in the electric power steering device according to the third embodiment of the present invention.

Now, a description is given of an electric power steering device according to a third embodiment of the present invention with reference to FIG. 13 to FIG. 15. In this case, a difference from the first embodiment is that the end time Tf is set to be variable by the initial acceleration in Step S05 of FIG. 13, and other parts are the same as those of the first embodiment. Thus, a description thereof is omitted, and only the difference is described.

In Step S05, the acceleration at this time point is set to an initial acceleration, a table storing a relationship between the initial acceleration and the end time Tf as shown in FIG. 14 is referred to, and the end time Tf is set depending on the initial acceleration. Step S05 can be processed within the same calculation period as that of Step S03, and thus the initial acceleration to be used can be the same value as the acceleration at a moment at which start of reverse steering is determined in Step S03.

The torque variation period at the time of reverse steering tends to become longer as reverse steering is performed for a longer period. Therefore, it is possible to cause an operation of the torque variation compensation unit only within the minimum required period by reducing the end time as the absolute value of the acceleration becomes larger, and prevent the stability of the control system from decreasing excessively.

The time response waveform at the time of corrective steering in this embodiment is shown in FIG. 15. In FIG. 10 and FIG. 11, the motor rotational acceleration immediately before reverse steering is about 5, which is a large value, the steering torque variation period is equal to or smaller than 0.05 second, and a period in which the reverse steering switching gain is 1 is also about 0.03 second.

Meanwhile, in FIG. 15, the motor rotational acceleration immediately before reverse steering is about 0.4, which is a small value, and the steering torque variation period becomes equal to or larger than 0.1 second. At this time, the end time Tf of the reverse steering period is set to be variable depending on the initial acceleration. Thus, when the initial acceleration is small as in FIG. 15, the period in which the reverse steering switching gain is 1 is extended to about 0.15 second, and steering torque variation at the time of reverse steering is suppressed.

In this manner, the transfer gain from input to output by the current command control unit is set to be increased after the reverse steering detection unit determines start of reverse steering until a set period in which torque variation at the time of reverse steering occurs ends. Therefore, it is possible to enable torque variation compensation only within the minimum required period depending on the motor rotational acceleration, and prevent the stability of the control system from decreasing excessively.

Fourth Embodiment

Figure 16:
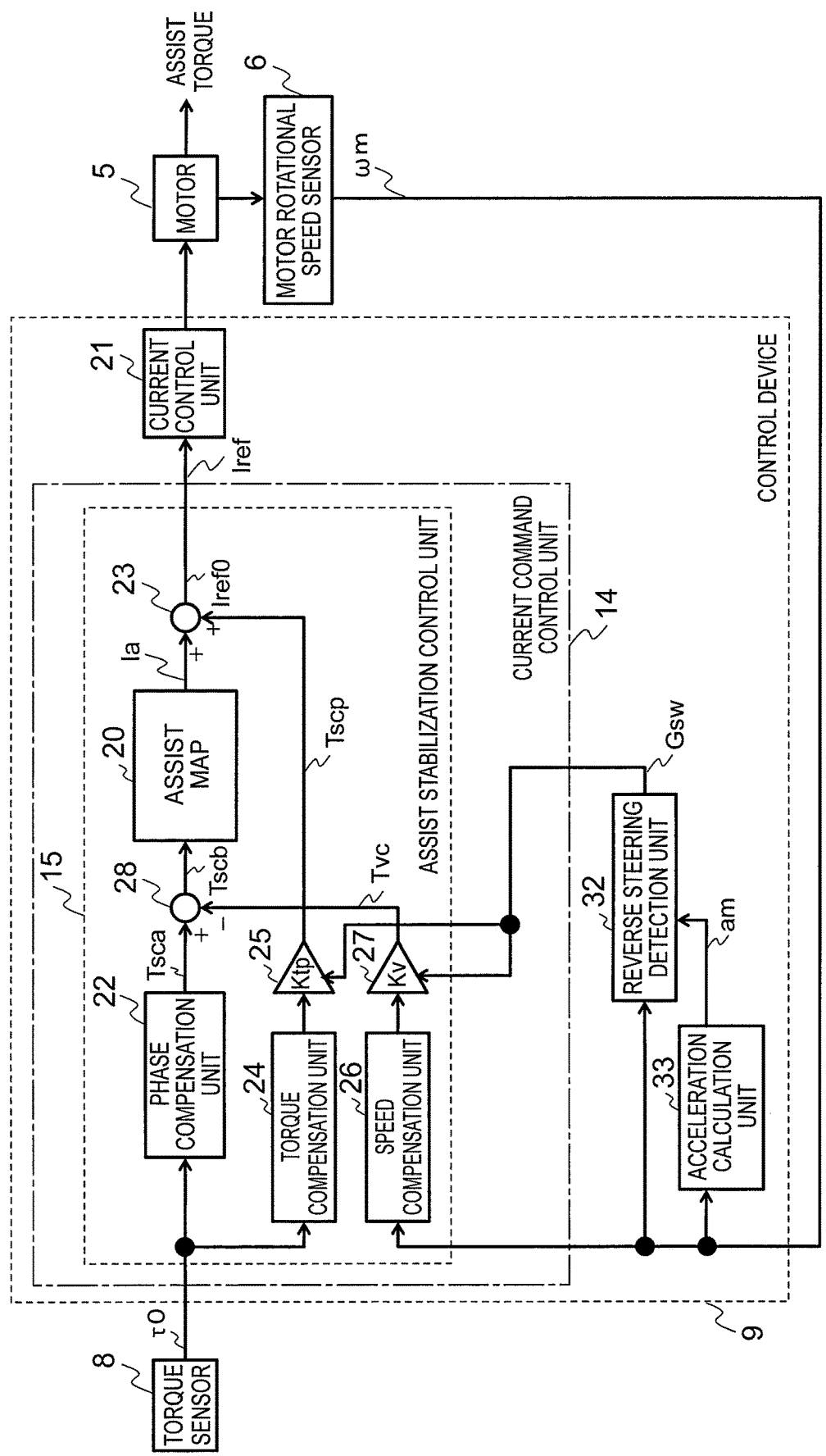
FIG. 16 is a block configuration diagram for illustrating a control device of an electric power steering device according to a fourth embodiment of the present invention.
Figure 17:
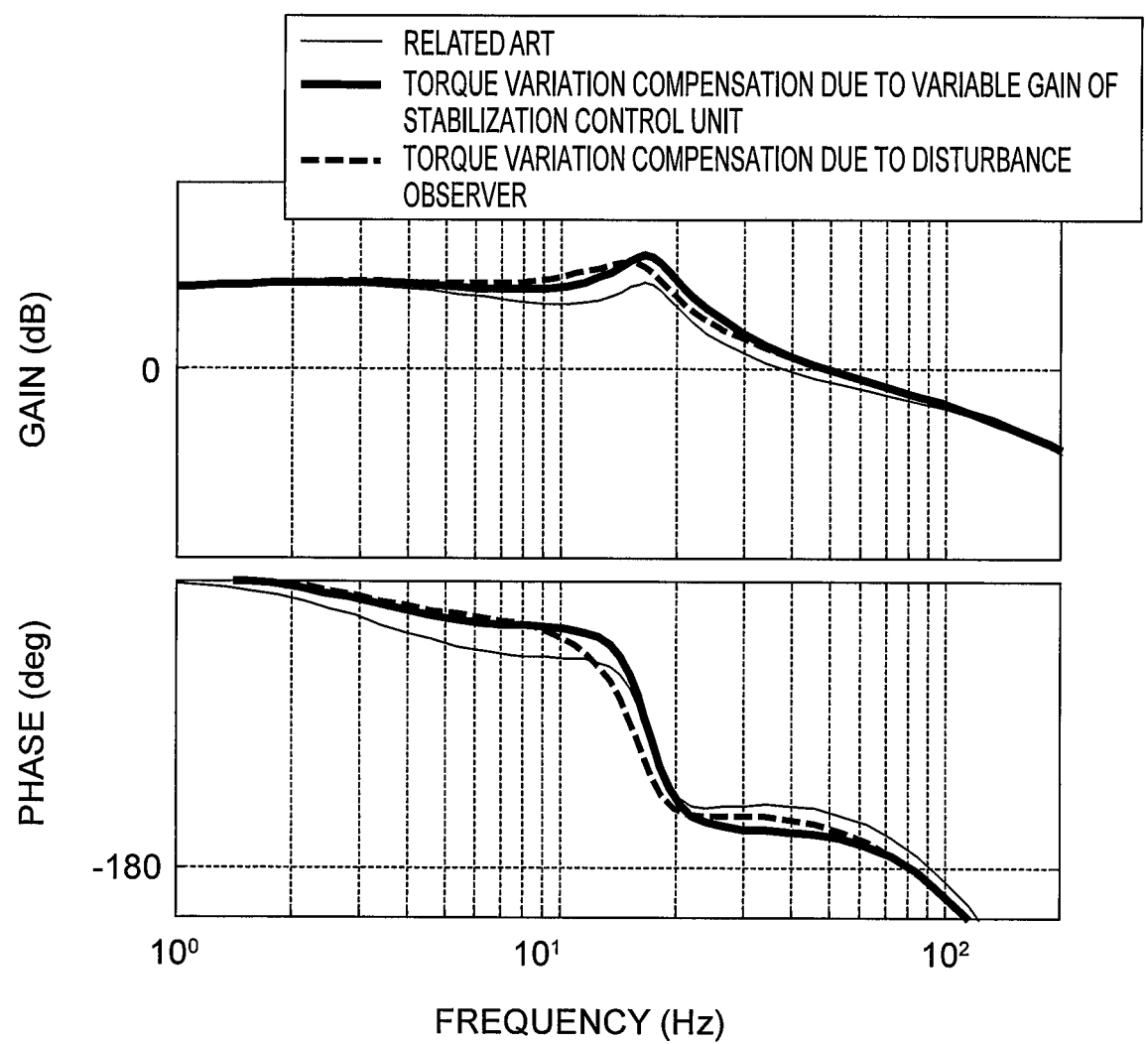
FIG. 17 is a Bode plot for showing an open loop transfer function in the electric power steering device according to the fourth embodiment of the present invention.

Now, a description is given of an electric power steering device according to a fourth embodiment of the present invention with reference to FIG. 16 and FIG. 17. In this case, a difference from the first embodiment is that control gains inside the assist stabilization control unit 15 illustrated in FIG. 16 are set to be variable by the reverse steering switching gain Gsw instead of the torque variation compensation unit 30 illustrated in FIG. 2, and other parts are the same as those of the first embodiment. Thus, a description thereof is omitted here, and only the difference is described.

In FIG. 16, the control gains Ktp and Kv inside the assist stabilization control unit 15 are set to be variable by the reverse steering switching gain. Specifically, control gains to be used for a purpose other than reverse steering are set to be normal control gains Ktp0 and Kv0, and larger control gains to be used only at the time of reverse steering are set to be control gains Ktp1 and Kv1 for reverse steering.

The assist stabilization control unit 15 calculates the control gains Ktp and Kv to be actually multiplied by the assist stabilization control unit 15 using the following expression as a liner combination of the weighted normal control gain and reverse steering control gain with the reverse steering switching gain Gsw being a weighting coefficient.

$$Ktp=(1-Gsw) \times Ktp0+Gsw \times Ktp1$$

$$Kv=(1-Gsw) \times Kv0+Gsw \times Kv1$$

An effect obtained in this embodiment is shown by the open loop transfer function of FIG. 17. In FIG. 17, the thin solid line indicates a case in which there is no torque variation compensation by related-art reverse steering detection, and the thick solid line indicates an open loop transfer function configured such that the control gains are variable due to detection of reverse steering in this embodiment. That is, the thin solid line indicates a characteristic due to the normal control gains Ktp0 and Kv0, and the thick solid line indicates a characteristic due to the reverse steering control gains Ktp1 and Kv1.

In FIG. 17, from the viewpoint of the gain characteristic, it is found that the gain characteristic increases in the bandwidth around 10 Hz to 50 Hz by switching the normal control gains Ktp0 and Kv0 to the reverse steering control gains Ktp1 and Kv1. That is, the frequency component of steering torque variation at the time of reverse steering is mainly around 10 Hz to 50 Hz, and thus the transfer gain in this bandwidth is caused to increase. Stability such as a phase margin or a gain margin decreases slightly as compared to the related art. However, required stability is ensured within a short period of time of reverse steering, and decrease in stability is minimized.

In this manner, it is possible to increase the gain characteristic of the open loop transfer function in the frequency bandwidth of steering torque variation by causing the control gains inside the assist stabilization control unit 15 to be variable by the reverse steering switching gain, and increasing the transfer gain from input to output by the current command control unit 14 in that frequency bandwidth. As a result, it is possible to suppress transmission of a disturbance in the frequency bandwidth to the steering wheel. Further, the gain of the open loop can be increased in a frequency bandwidth equal to or smaller than the cross-over frequency to transmit a current command substantially opposite to the disturbance as a feedback, so that an action of canceling the disturbance can be obtained.

In the example of the assist stabilization control unit 15 described above, the steering torque signal τ0 and the motor rotational speed signal ωm are input to output the current command Iref0. However, the motor rotational speed signal ωm may not be used as input. For example, the speed compensation unit 26, the speed control gain Kv (27), and the subtractor 28 may be removed from the assist stabilization control unit 15, and the assist parallel torque gain Ktp (25) may be set to a larger value instead, to thereby obtain a stabilization effect.

Thus, the assist parallel torque gain Ktp (25) may only be the control gain caused to be variable by the reverse steering switching gain. With this, the transfer gain from input to output by the current command control unit 14 can be increased in the frequency bandwidth of steering torque variation.

Further, in contrast, the torque compensation unit 24, the assist parallel torque gain Ktp (25), and the adder 23 can be removed from the assist stabilization control unit 15, and the speed control gain Kv (27) can be set to a larger value instead, to thereby obtain a stabilization effect.

In this case, the speed control gain Kv (27) may only be the control gain caused to be variable by the reverse steering switching gain. With this, the transfer gain from input to output by the current command control unit 14 can be increased in the frequency bandwidth of steering torque variation.

Further, the current command control unit includes a control gain capable of changing the transfer gain from input to output by the current command control unit at the time of detection of reverse steering, and is configured to increase the transfer gain from input to output by the current command control unit by increasing the control gain. Thus, it is possible to suppress torque variation at the time of reverse steering through simple calculation by causing the control gain to be variable without incorporating an additional torque variation compensation unit.

Fifth Embodiment

Figure 18:
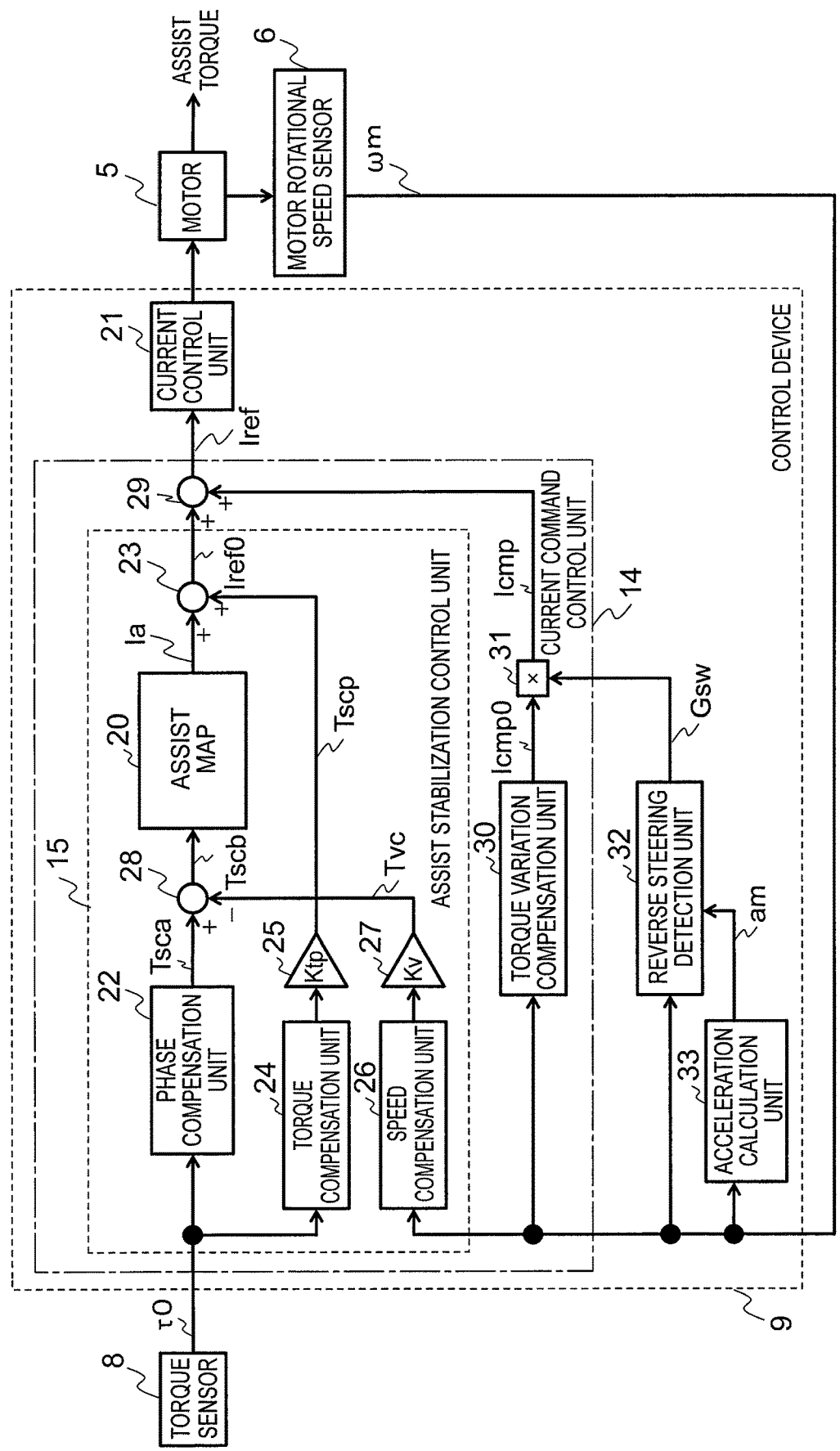
FIG. 18 is a block configuration diagram for illustrating a control device of an electric power steering device according to a fifth embodiment of the present invention.

Now, a description is given of an electric power steering device according to a fifth embodiment of the present invention with reference to FIG. 18. In this case, a difference from the first embodiment is that the torque variation compensation unit 30 illustrated in FIG. 18 receives input of the motor rotational speed ωm, and other parts are the same as those of the first embodiment. Thus, a description thereof is omitted here, and only the difference is described.

In FIG. 18, the motor rotational speed ωm exhibits a response similar to a derivative of the steering torque τ0 at the resonance frequency or more, and thus steering torque variation at the time of reverse steering can similarly be extracted by the motor rotational speed ωm. Therefore, it is possible to suppress steering torque variation with the internal configuration of the torque variation compensation unit 30 being similar to those of the first embodiment to the third embodiment.

That is, the current command control unit includes a torque variation compensation unit configured to receive input of the motor rotational speed and output a compensation current, and the control device is configured to increase the transfer gain from input to output by the current command control unit through correction of the current command by the compensation current. Thus, the torque variation compensation unit can be designed independently of the assist stabilization control unit to obtain an optimum configuration for suppressing torque variation. Therefore, it is possible to greatly reduce steering torque variation.

The first to third embodiments described above are configured such that the transfer gain from the steering torque signal, which is input, to output by the current command control unit is increased when the reverse steering detection unit determines start of reverse steering. However, the fifth embodiment is configured such that the transfer gain from a motor rotational speed signal, which is input, to output by the current command control unit is increased when the reverse steering detection unit determines start of reverse steering. That is, any one of the steering torque signal or the motor rotational speed signal may be input to increase the transfer gain at the time of detection of reverse steering, and both thereof may be input as illustrated in the fourth embodiment.

Sixth Embodiment

Figure 19:
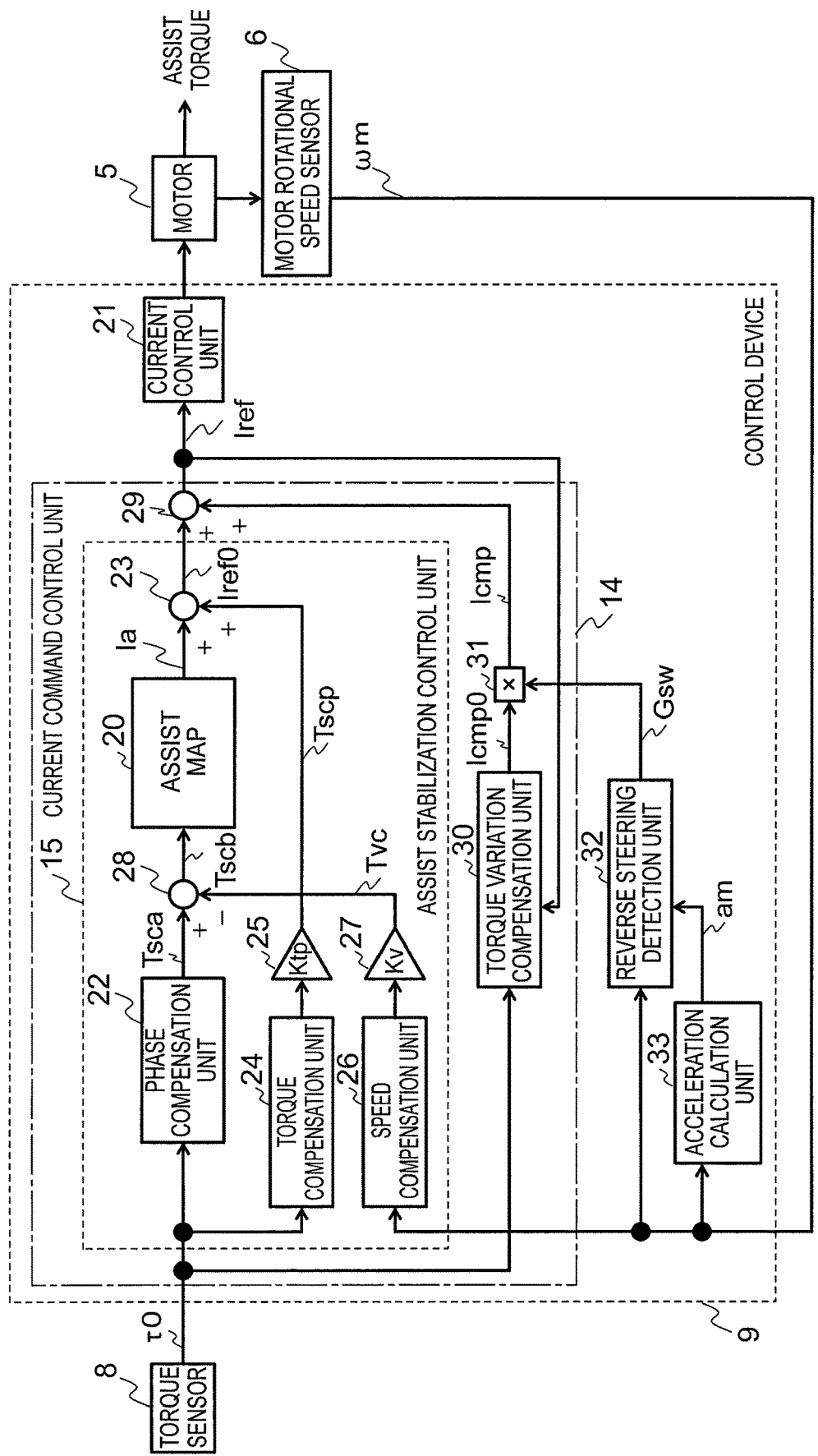
FIG. 19 is a block configuration diagram for illustrating a control device of an electric power steering device according to a sixth embodiment of the present invention.
Figure 20:
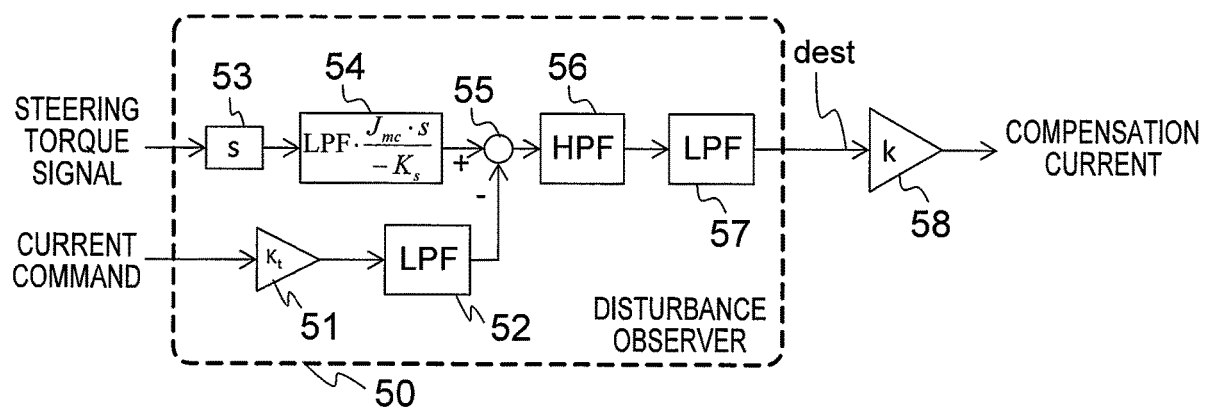
FIG. 20 is a block configuration diagram for illustrating a torque variation compensation unit of the electric power steering device according to the sixth embodiment of the present invention.

Now, a description is given of an electric power steering device according to a sixth embodiment of the present invention with reference to FIG. 19 and FIG. 20. In this case, a difference from the first embodiment is that the torque variation compensation unit 30 illustrated in FIG. 19 additionally receives input of the current command Iref to form a disturbance observer, and other parts are the same as those of the first embodiment. Thus, a description thereof is omitted here, and only the difference is described.

First, a description is given of the torque variation compensation unit 30 with reference to FIG. 20. In FIG. 20, the torque variation compensation unit 30 includes a disturbance observer 50 configured to estimate a disturbance torque based on a steering torque signal and a current command, and a compensation rate gain 58. Further, the disturbance observer 50 includes a torque conversion gain 51, a low-pass filter 52, a differentiator 53, an inverse model 54 with LPF, a subtractor 55, a steering frequency component removal filter 56, and a high-frequency removal filter 57.

The disturbance observer 50 is configured to multiply a current command, which is input from the controller for controlling a control target, by the torque conversion gain 51 for conversion into a motor torque, and subjects the obtained value to processing for reducing a high-frequency component by the low-pass filter 52, to thereby generate an input conversion signal.

Further, the disturbance observer 50 is configured to differentiate a steering torque signal by the differentiator 53, process the differentiated value by an inverse model 54 with LPF, and estimate an input estimation signal, which is all the input to the control target. Further, the disturbance observer 50 is configured to subtract the input conversion signal from the input estimation signal by the subtractor 55, and estimate a signal input to the control target from components other than the controller, namely, a disturbance torque.

After that, the disturbance observer 50 subjects the estimated disturbance torque to processing of reducing a steering low-frequency component by the steering frequency component removal filter 56 and to processing of reducing a steering high-frequency component by the high-frequency removal filter 57, and extracts a frequency component of the disturbance torque to be suppressed, to thereby output an estimated disturbance dest.

The torque variation compensation unit 30 multiples the estimated disturbance dest by the compensation rate gain 58, and outputs the torque variation compensation current command Icmp0. The compensation rate gain 58 takes the value of from −1 to 0, and when the compensation rate gain 58 indicates −1, this means a command to cancel 100% of the disturbance torque, when the compensation rate gain 58 indicates 0, this means a command to cancel 0% of the disturbance torque, or when the compensation rate gain 58 indicates an intermediate value, this means a command exhibiting a decrease ratio between 100% and 0%.

An effect obtained in this embodiment is shown by the open loop transfer function of FIG. 17 illustrated above. In FIG. 17, the thin solid line indicates a case in which there is no torque variation compensation by related-art reverse steering detection, and the thick broken line indicates an open loop transfer function exhibited by the disturbance observer 50 at the time of detection of reverse steering in this embodiment.

In FIG. 17, from the viewpoint of the gain characteristic, it is found that the gain increases in a bandwidth around 10 Hz to 50 Hz due to an action of a torque variation compensation current command by the disturbance observer at the time of detection of reverse steering. That is, the frequency component of steering torque variation at the time of reverse steering is mainly around 10 Hz to 50 Hz, and thus the transfer gain in this bandwidth is caused to increase. Stability such as a phase margin or a gain margin decreases as compared to the related art. However, required stability is ensured within a short period of time of reverse steering, and decrease in stability is minimized.

In this manner, it is possible to increase the gain characteristic of the open loop transfer function in the frequency bandwidth of steering torque variation by outputting a torque variation compensation current command using the reverse steering switching gain by the disturbance observer at the time of reverse steering, and increasing the transfer gain from input to output by the current command control unit 14 in that frequency bandwidth. As a result, it is possible to suppress transmission of a disturbance in the frequency bandwidth to the steering wheel. Further, the gain of the open loop transfer function can be increased in a frequency bandwidth equal to or smaller than the cross-over frequency to transmit a current command substantially opposite to the disturbance as a feedback, so that an action of canceling the disturbance can be obtained.

An actual current detected by a current detector may be used as a current command to be input to the disturbance observer, and can be treated as a substantially similar signal in the torque variation frequency when the responsiveness of the current control unit is set to be high. Further, the motor rotational speed signal ωm may be used as a steering torque signal to be input to the disturbance observer, and the differentiator may be removed. Further, the derivative of the steering torque and the motor rotational speed exhibit similar responses in the resonance frequency or more of steering, and thus the disturbance torque can be estimated similarly even when the steering torque is replaced with the motor rotational speed signal.

Further, the torque variation compensation unit in this embodiment includes a disturbance observer configured to receive input of a current command or a current from the motor, and estimate a disturbance torque. Then, the disturbance torque is multiplied by the gain to generate a torque variation compensation current command, namely, a compensation current. Therefore, it is possible to suppress steering torque variation at the time of reverse steering with a simple design based on the technique of designing an observer.

REFERENCE SIGNS LIST 5 motor, 6 motor rotational speed sensor (motor rotational speed detection unit), 14 current command control unit, 30 torque variation compensation unit, 33 acceleration calculation unit, 41 high-pass filter, 43 band-pass filter, 50 disturbance observer

The invention claimed is:

1. An electric power steering device, comprising:
a motor configured to output a torque based on a steering torque of a driver;
a motor rotational speed detection unit configured to detect a rotational speed of the motor;
an acceleration calculation unit configured to calculate a rotational acceleration of the motor based on the rotational speed of the motor;
a reverse steering detection unit configured to determine start of reverse steering when a magnitude of the rotational speed of the motor is equal to or smaller than a set speed, the rotational acceleration of the motor is in a direction of causing the rotational speed of the motor to become 0, and a magnitude of the rotational acceleration of the motor is equal to or larger than a set acceleration; and
a current command control unit configured to output a current command for the motor based on the steering torque or the rotational speed of the motor,
wherein the current command control unit is configured to increase a transfer gain from input to output by the current command control unit when the reverse steering detection unit determines start of the reverse steering.

2. The electric power steering device according to claim 1, wherein the set speed is set to a value proportional to the rotational acceleration of the motor.

3. The electric power steering device according to claim 1, wherein the current command control unit is configured to increase a transfer gain from input to output by the current command control unit after the reverse steering detection unit determines start of the reverse steering until a set period in which torque variation at the time of the reverse steering occurs ends.

4. The electric power steering device according to claim 2, wherein the current command control unit is configured to increase a transfer gain from input to output by the current command control unit after the reverse steering detection unit determines start of the reverse steering until a set period in which torque variation at the time of the reverse steering occurs ends.

5. The electric power steering device according to claim 1,
wherein the current command control unit includes a torque variation compensation unit configured to receive input of the steering torque or the rotational speed of the motor, and output a compensation current, and
wherein the current command control unit is configured to increase the transfer gain from input to output by the current command control unit through correction of the current command by the compensation current.

6. The electric power steering device according to claim 2,
wherein the current command control unit includes a torque variation compensation unit configured to receive input of the steering torque or the rotational speed of the motor, and output a compensation current, and
wherein the current command control unit is configured to increase the transfer gain from input to output by the current command control unit through correction of the current command by the compensation current.

7. The electric power steering device according to claim 3,
wherein the current command control unit includes a torque variation compensation unit configured to receive input of the steering torque or the rotational speed of the motor, and output a compensation current, and
wherein the current command control unit is configured to increase the transfer gain from input to output by the current command control unit through correction of the current command by the compensation current.

8. The electric power steering device according to claim 4,
wherein the current command control unit includes a torque variation compensation unit configured to receive input of the steering torque or the rotational speed of the motor, and output a compensation current, and wherein the current command control unit is configured to increase the transfer gain from input to output by the current command control unit through correction of the current command by the compensation current.

9. The electric power steering device according to claim 5, wherein the torque variation compensation unit includes a band-pass filter or a high-pass filter configured to pass a frequency bandwidth of torque variation at the time of the reverse steering.

10. The electric power steering device according to claim 6, wherein the torque variation compensation unit includes a band-pass filter or a high-pass filter configured to pass a frequency bandwidth of torque variation at the time of the reverse steering.

11. The electric power steering device according to claim 7, wherein the torque variation compensation unit includes a band-pass filter or a high-pass filter configured to pass a frequency bandwidth of torque variation at the time of the reverse steering.

12. The electric power steering device according to claim 8, wherein the torque variation compensation unit includes a band-pass filter or a high-pass filter configured to pass a frequency bandwidth of torque variation at the time of the reverse steering.

13. The electric power steering device according to claim 5, wherein the torque variation compensation unit includes a disturbance observer configured to receive input of the current command or a current from the motor, and estimate a disturbance torque.

14. The electric power steering device according to claim 6, wherein the torque variation compensation unit includes a disturbance observer configured to receive input of the current command or a current from the motor, and estimate a disturbance torque.

15. The electric power steering device according to claim 7, wherein the torque variation compensation unit includes a disturbance observer configured to receive input of the current command or a current from the motor, and estimate a disturbance torque.

16. The electric power steering device according to claim 8, wherein the torque variation compensation unit includes a disturbance observer configured to receive input of the current command or a current from the motor, and estimate a disturbance torque.

17. The electric power steering device according to claim 1, wherein the current command control unit includes a control gain capable of changing the transfer gain, and wherein the current command control unit is configured to increase the transfer gain from input to output by the current command control unit by increasing the control gain.

18. The electric power steering device according to claim 2, wherein the current command control unit includes a control gain capable of changing the transfer gain, and wherein the current command control unit is configured to increase the transfer gain from input to output by the current command control unit by increasing the control gain.

19. The electric power steering device according to claim 3, wherein the current command control unit includes a control gain capable of changing the transfer gain, and wherein the current command control unit is configured to increase the transfer gain from input to output by the current command control unit by increasing the control gain.

20. The electric power steering device according to claim 4, wherein the current command control unit includes a control gain capable of changing the transfer gain, and wherein the current command control unit is configured to increase the transfer gain from input to output by the current command control unit by increasing the control gain.

* * * * *